United States Patent
Dvorak

(10) Patent No.: US 11,017,165 B2
(45) Date of Patent: May 25, 2021

(54) METHODS AND SYSTEMS FOR CONNECTING A SPREADSHEET TO EXTERNAL DATA SOURCES WITH TEMPORAL REPLICATION OF CELL BLOCKS

(71) Applicant: Adaptam Inc., Atherton, CA (US)

(72) Inventor: Robert E. Dvorak, Atherton, CA (US)

(73) Assignee: Adaptam Inc., Atherton, CA (US)

( * ) Notice: Subject to any disclaimer, the term of this patent is extended or adjusted under 35 U.S.C. 154(b) by 0 days.

(21) Appl. No.: 16/031,759

(22) Filed: Jul. 10, 2018

(65) Prior Publication Data

US 2019/0012306 A1    Jan. 10, 2019

Related U.S. Application Data

(60) Provisional application No. 62/530,794, filed on Jul. 10, 2017, provisional application No. 62/530,786, (Continued)

(51) Int. Cl.
*G06F 40/00* (2020.01)
*G06F 40/186* (2020.01)
(Continued)

(52) U.S. Cl.
CPC .............. *G06F 40/186* (2020.01); *G06F 8/34* (2013.01); *G06F 16/901* (2019.01);
(Continued)

(58) Field of Classification Search
CPC .... G06F 17/246; G06F 17/248; G06F 17/211; G06F 17/24; G06F 40/18
See application file for complete search history.

(56) References Cited

U.S. PATENT DOCUMENTS 5,815,421 A    9/1998  Dulong et al.
5,983,268 A  * 11/1999  Freivald ................ G06F 16/957
                                                        709/218
(Continued)

OTHER PUBLICATIONS

"Parts of an Algebraic Expression", Nelson Mathematics Secondary Year Two, Cycle One, 2009, Nelson Education Ltd., 4 pages.
(Continued)

*Primary Examiner* — Scott T Baderman
*Assistant Examiner* — Barbara M Level
(74) *Attorney, Agent, or Firm* — Haynes Beffel & Wolfeld, LLP; Ernest J. Beffel, Jr.

(57) ABSTRACT

The technology disclosed relates to automating creating of new blocks of cells in a spreadsheet—receiving a user identification of a first block of contiguous cells specifying access to first data from an external source using a formulaic data specification; causing display of a wizard panel with controls operable without user input, and receiving a user specification of a replication position at which a second block of cells is to be replicated as a variation on the first block; receiving a user specification of a temporal interval relationship between the first and second blocks; receiving a creation trigger parameter for when the second block should be replicated at the second position; and creating the second block at the replication position and inserting an adjusted formulaic specification for the second data, based on the formulaic specification for the first data and the temporal interval relationship between the first and second blocks.

20 Claims, 14 Drawing Sheets
(12 of 14 Drawing Sheet(s) Filed in Color)

Related U.S. Application Data filed on Jul. 10, 2017, provisional application No. 62/530,835, filed on Jul. 10, 2017.

(51) Int. Cl.
| | | |
|---|---|---|
| *G06F 8/34* | (2018.01) | |
| *G06F 40/16* | (2020.01) | |
| *G06F 40/18* | (2020.01) | |
| *G06F 40/103* | (2020.01) | |
| *G06F 40/174* | (2020.01) | |
| *G06F 40/205* | (2020.01) | |
| *G06F 16/903* | (2019.01) | |
| *G06F 16/901* | (2019.01) | |
| *G06F 17/11* | (2006.01) | |
| *G06F 9/451* | (2018.01) | |

(52) U.S. Cl.
CPC ............ *G06F 16/903* (2019.01); *G06F 17/11* (2013.01); *G06F 40/103* (2020.01); *G06F 40/16* (2020.01); *G06F 40/174* (2020.01); *G06F 40/18* (2020.01); *G06F 40/205* (2020.01); *G06F 9/453* (2018.02)

(56) References Cited

U.S. PATENT DOCUMENTS

| | | | |
|---|---|---|---|
| 6,317,750 B1 * | 11/2001 | Tortolani | G06F 17/246 |
| 6,985,895 B2 | 1/2006 | Witkowski et al. | |
| 6,988,241 B1 * | 1/2006 | Guttman | G06F 17/246 |
| | | | 715/220 |
| 7,099,890 B2 | 8/2006 | Cahill et al. | |
| 7,117,435 B1 | 10/2006 | Kotler et al. | |
| 7,120,866 B2 | 10/2006 | Kotler et al. | |
| 7,155,667 B1 | 12/2006 | Kotler et al. | |
| 7,302,444 B1 | 11/2007 | Dunmore et al. | |
| 7,350,141 B2 | 3/2008 | Kotler | |
| 7,370,274 B1 | 5/2008 | Stuple et al. | |
| 7,412,645 B2 | 8/2008 | Kotler | |
| 7,506,242 B2 | 3/2009 | Kotler | |
| 7,506,243 B2 | 3/2009 | Kotler | |
| 7,523,390 B2 | 4/2009 | Kotler | |
| 7,546,533 B2 | 6/2009 | Sareen et al. | |
| 7,549,115 B2 | 6/2009 | Kotler | |
| 7,673,227 B2 | 3/2010 | Kotler | |
| 7,702,997 B2 | 4/2010 | Kotler | |
| 7,702,998 B2 | 4/2010 | Kotler et al. | |
| 7,810,032 B2 | 10/2010 | Bauchot et al. | |
| 8,140,549 B2 | 3/2012 | Barinaga | |
| 8,312,371 B2 | 11/2012 | Ording | |
| 8,341,512 B2 | 12/2012 | Sol et al. | |
| 9,092,412 B2 | 7/2015 | Salch et al. | |
| 9,305,176 B2 | 4/2016 | Gloski et al. | |
| 9,436,637 B2 | 9/2016 | Kommanaboyina | |
| 9,727,989 B2 | 8/2017 | Garg et al. | |
| 9,990,349 B2 | 6/2018 | Campbell et al. | |
| 10,019,758 B2 | 7/2018 | Bartolucci | |
| 10,140,352 B2 | 11/2018 | Hariharan et al. | |
| 2002/0036662 A1 * | 3/2002 | Gauthier | G06F 17/246 |
| | | | 715/835 |
| 2002/0169799 A1 | 11/2002 | Voshell | |
| 2003/0009411 A1 * | 1/2003 | Ram | G06F 17/246 |
| | | | 705/37 |
| 2003/0110191 A1 * | 6/2003 | Handsaker | G06F 17/246 |
| | | | 715/212 |
| 2003/0212953 A1 | 11/2003 | Serraf | |
| 2005/0044496 A1 | 2/2005 | Kotler et al. | |
| 2006/0069635 A1 * | 3/2006 | Ram | G06Q 30/08 |
| | | | 705/37 |
| 2006/0131383 A1 * | 6/2006 | Battagin | G06Q 40/04 |
| | | | 235/377 |
| 2007/0005635 A1 | 1/2007 | Martinez et al. | |
| 2007/0136666 A1 * | 6/2007 | Khen | G06F 17/246 |
| | | | 715/217 |
| 2010/0211862 A1 | 8/2010 | Parish et al. | |
| 2013/0013994 A1 | 1/2013 | Handsaker et al. | |
| 2013/0021377 A1 | 1/2013 | Doll | |
| 2013/0073939 A1 * | 3/2013 | Honsowetz | G06F 17/246 |
| | | | 715/212 |
| 2015/0082137 A1 * | 3/2015 | Zarpas | G06F 17/246 |
| | | | 715/212 |
| 2015/0149893 A1 | 5/2015 | Lukic et al. | |
| 2015/0254226 A1 | 9/2015 | Renshaw et al. | |
| 2016/0055139 A1 * | 2/2016 | Creason | G06F 17/246 |
| | | | 715/217 |
| 2016/0371249 A1 | 12/2016 | Chilakamarri et al. | |
| 2016/0378842 A1 * | 12/2016 | Demonsant | G06F 16/284 |
| | | | 707/602 |
| 2017/0004125 A1 * | 1/2017 | Honsowetz | G06F 17/246 |
| 2017/0124046 A1 * | 5/2017 | Campbell | G06F 17/212 |
| 2017/0124049 A1 * | 5/2017 | Campbell | G06F 17/212 |
| 2018/0005122 A1 * | 1/2018 | McDaid | G06N 7/005 |
| 2018/0302393 A1 * | 10/2018 | Mazur | G06F 21/6209 |
| 2019/0340219 A1 * | 11/2019 | Schoedl | G06F 40/18 |

OTHER PUBLICATIONS

"Copying Formulas and using Relative and Absolute Cell References Tutorial", Mar. 16, 2016, www.teststeststests.com, pp. 1-13 (Year: 2016).

U.S. Appl. No. 16/031,339—Response to Final Office Action dated May 21, 2020, filed Nov. 23, 2020, 16 pages.

U.S. Appl. No. 16/031,339—Nonfinal Office Action dated Dec. 21, 2020, 63 pages.

U.S. Appl. No. 16/031,379—Nonfinal Office Action dated Jul. 22, 2020, 30 pages.

U.S. Appl. No. 16/031,759—Response to Final Office Action dated Sep. 4, 2020, filed Jan. 4, 2021, 14 pages.

"How to create and share custom Stylesheets in Microsoft Word", PC World Magazine, Sep. 14, 2014, 13 pages (downloaded from https://web.archive.org/web/20140914082635/https://www.pcworld.com/article/2156364/how-to-create-and-share-custom-style-sets.html Jan. 6, 2021).

Sartain, JD, "How to create and share custom Style Sheets in Wordand PowerPoint", PC World Magazine, Aug. 8, 2018, 11 pages (downloaded from https://www.pcworld.com/article/2156364/how-to-create-and-share-custom-style-sets.html Jan. 6, 2021).

U.S. Appl. No. 16/031,379—Response to Nonfinal Office Action dated Jul. 22, 2020, filed Jan. 22, 2021, 12 pages.

U.S. Appl. No. 16/031,339—Non-Final Office Action dated Nov. 21, 2019, 36 pages.

Understanding Styles in Microsoft Word—A Tutorial in the Intermediate Users Guide to Microsoft Word, last edited by Charles Kenyon on Apr. 30, 2017, retrieved from http://www.addbalance.com/usersguide/styles.htm, archived on Jun. 30, 2017, 55 pages.

"Apply multiple styles to single text selection", Microsoft Community, answers.mircrosoft,com, Apr. 9, 2018, 3 pages (accessed Apr. 21, 2020 at https://answers.microsoft.com/en-us/msoffice/forum/msoffice_word-mso_mac-mso_mac2011/apply-multiple-styles-to-single-text-selection/654ca4ad-a202-43aa-b7e1-b4c7cdea5acb).

U.S. Appl. No. 16/031,339—Final Office Action dated May 21, 2020, 54 pages.

U.S. Appl. No. 16/031,339—Response to Office Action dated Nov. 21, 2019, filed Apr. 21, 2020, 36 pages.

* cited by examiner

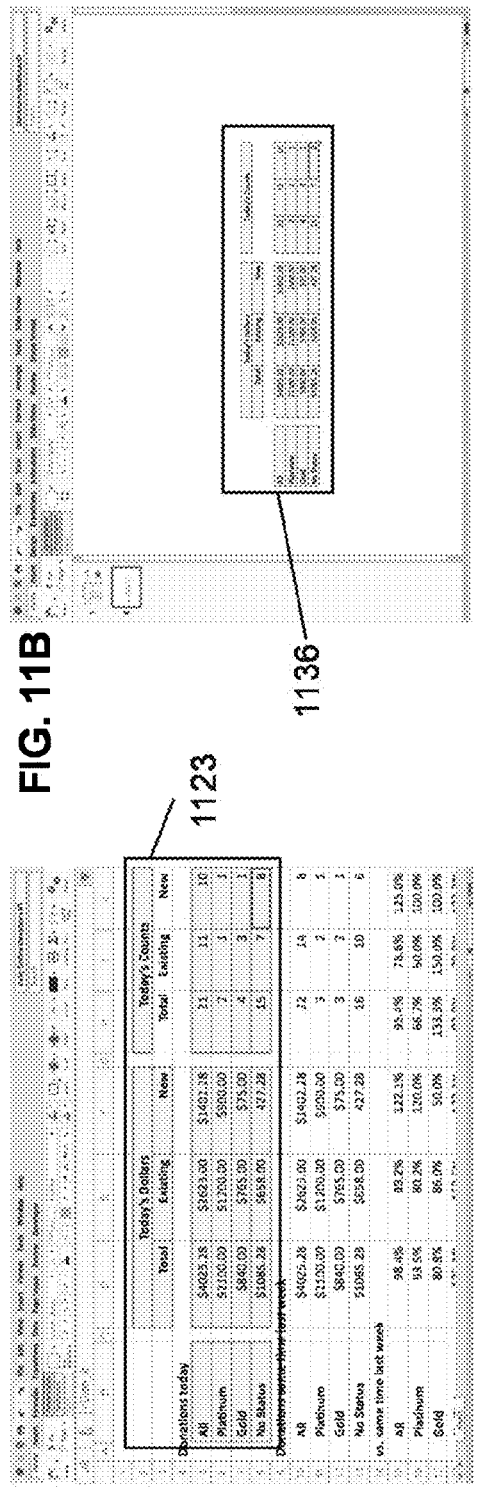
FIG. 11B
FIG. 11A
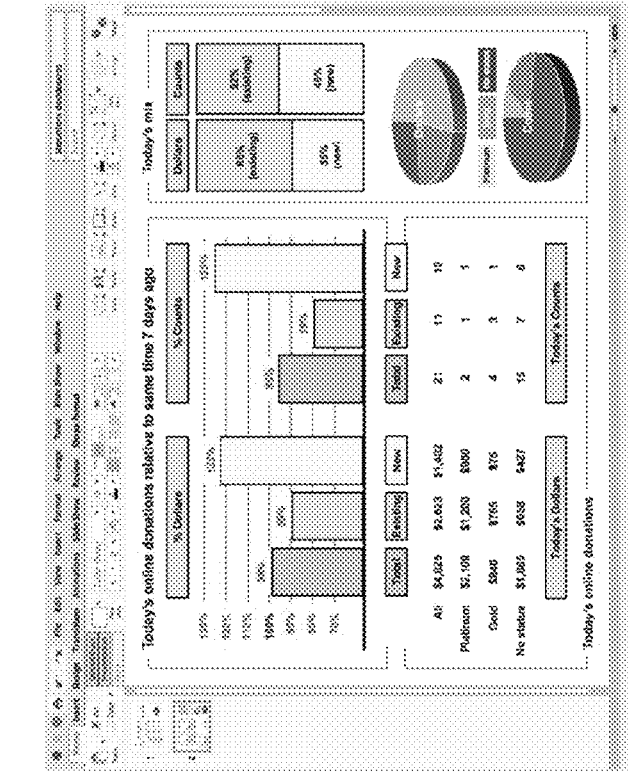
FIG. 11D
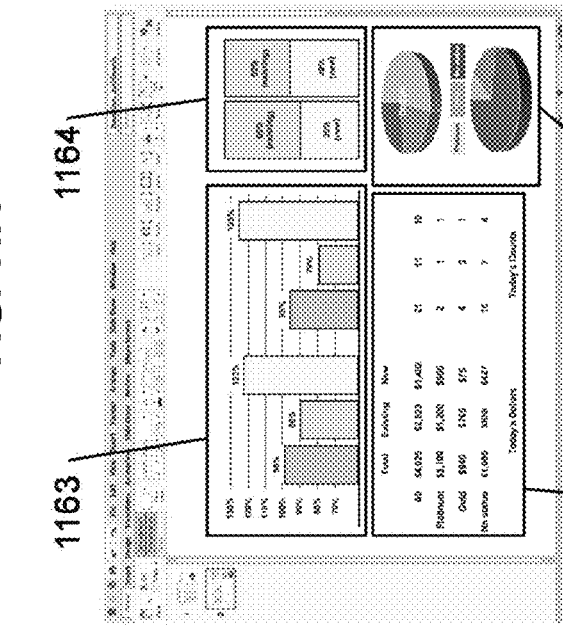
FIG. 11C

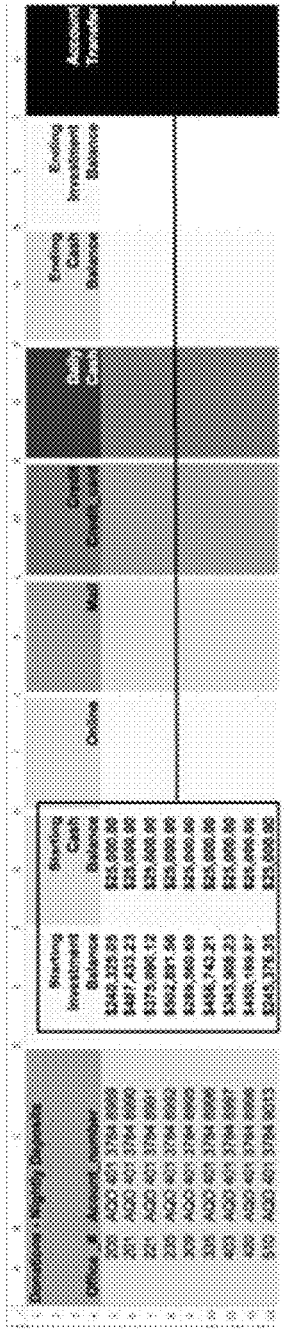
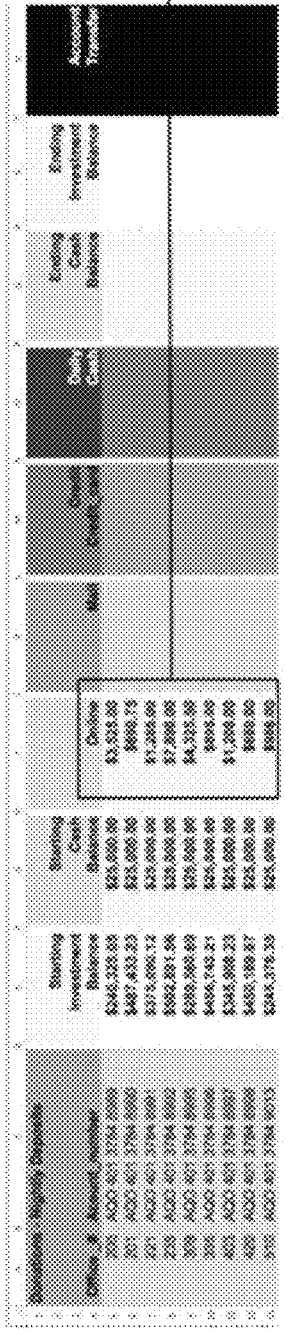
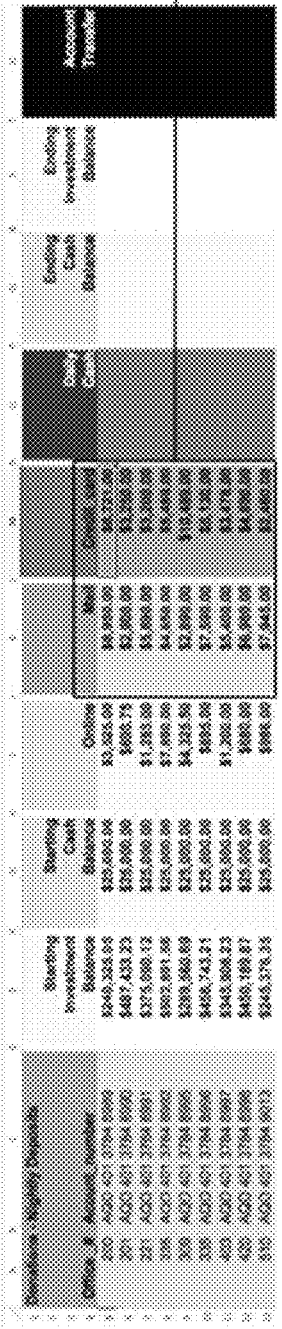
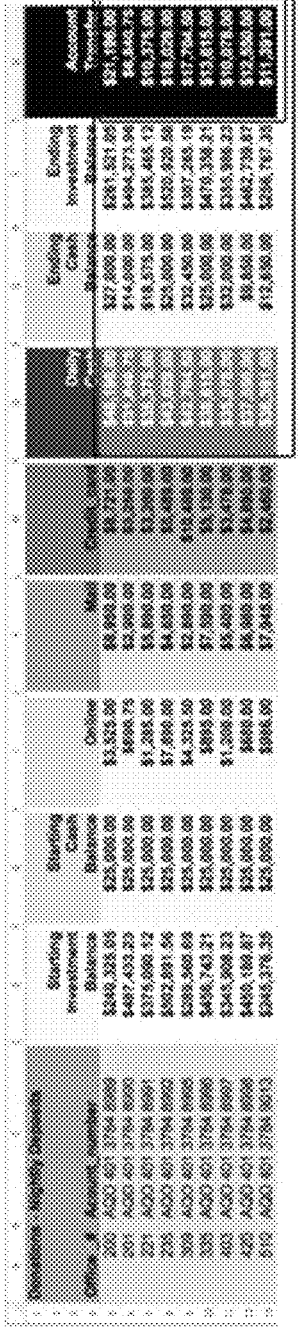

METHODS AND SYSTEMS FOR CONNECTING A SPREADSHEET TO EXTERNAL DATA SOURCES WITH TEMPORAL REPLICATION OF CELL BLOCKS

PRIORITY APPLICATIONS

This application claims the benefit of three provisional applications filed on the same day. One is U.S. Provisional Patent Application No. 62/530,835, entitled, "METHODS AND SYSTEMS FOR PROVIDING SELECTIVE MULTI-WAY REPLICATION AND ATOMIZATION OF CELL BLOCKS AND OTHER ELEMENTS IN SPREADSHEETS AND PRESENTATIONS" filed on Jul. 10, 2017. The next is U.S. Provisional Application No. 62/530,786, entitled, "METHODS AND SYSTEMS FOR CONNECTING A SPREADSHEET TO EXTERNAL DATA SOURCES WITH FORMULAIC SPECIFICATION OF DATA RETRIEVAL" filed on Jul. 10, 2017. Another is U.S. Provisional Patent Application No. 62/530,794, entitled, "METHODS AND SYSTEMS FOR CONNECTING A SPREADSHEET TO EXTERNAL DATA SOURCES WITH TEMPORAL REPLICATION OF CELL BLOCKS" filed on Jul. 10, 2017.

RELATED APPLICATIONS

This application is one of three related applications filed on the same day. One is U.S. patent application Ser. No. 16/031,339, entitled, "METHODS AND SYSTEMS FOR PROVIDING SELECTIVE MULTI-WAY REPLICATION AND ATOMIZATION OF CELL BLOCKS AND OTHER ELEMENTS IN SPREADSHEETS AND PRESENTATIONS" filed on Jul. 10, 2018.

The other is U.S. application Ser. No. 16/031,379, entitled, "METHODS AND SYSTEMS FOR CONNECTING A SPREADSHEET TO EXTERNAL DATA SOURCES WITH FORMULAIC SPECIFICATION OF DATA RETRIEVAL" filed on Jul. 10, 2018.

Another is U.S. patent application Ser. No. 16/031,759, entitled, "METHODS AND SYSTEMS FOR CONNECTING A SPREADSHEET TO EXTERNAL DATA SOURCES WITH TEMPORAL REPLICATION OF CELL BLOCKS" also filed on Jul. 10, 2018.

Each of the contemporaneously filed non-provisional applications claim the benefit of the three provisional applications listed above. The related and priority applications are hereby incorporated by reference for all purposes.

BACKGROUND

The technology disclosed relates to formulaically handling large, complex data sets in spreadsheet applications, replicating spreadsheet functionality for non-spreadsheet cell data. In particular, it relates to ways for users to work with a broad spectrum of numeric and text data not stored in a spreadsheet, including data not discretely defined. The technology disclosed also relates to displaying non-spreadsheet cell (NSC) data formulas, formulaic values and numeric values in cells, while stepping through a progression of complicated calculations.

An opportunity arises to offer spreadsheet calculation capabilities that scale beyond one calculation per cell, allowing users to perform scalable calculations in spreadsheet cells, which previously would have required coding in an embedded software language. Better, easier analysis of complicated external data sets may result.

SUMMARY

The disclosed technology includes a spreadsheet application with a spreadsheet command-driven automation capability that automatically generates new cell, column, row, worksheet, chart and other spreadsheet results. These capabilities allow users to employ a spreadsheet as a replacement for batch and real-time applications using cell commands and not requiring macro recording or use of embedded programming languages.

The technology disclosed relates to automating creating of a new block of cells in a spreadsheet: receiving a user identification of a first block of contiguous cells in a spreadsheet, a plurality of cells in the first block specifying access to first data from an external source using a formulaic specification of the first data. The disclosed technology also relates to causing display of a wizard panel with controls that are operable without user input of scripting or macro code, and receiving a user specification of a replication position at which a second block of cells is to be replicated as a variation on the first block. The technology further relates to receiving a user specification of a temporal interval relationship between the first and second blocks, receiving a creation trigger parameter for when the second block should be replicated at the second position, and creating the second block at the replication position and inserting an adjusted formulaic specification for the second data, based on the formulaic specification for the first data and the temporal interval relationship between the first and second blocks. In some implementations, the creation trigger parameter for the second block is a subscription parameter based on availability of updated data from the external source, responsive to the adjusted formulaic data specification in the second block for the second data.

Particular aspects of the technology disclosed are described in the claims, specification and drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The color drawings also may be available in PAIR via the Supplemental Content tab.

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 1A, FIG. 1B, FIG. 1C and FIG. 1D illustrate the set up and use of Column Auto Cell Replication (ACR).

FIG. 2A, FIG. 2B, FIG. 2C, FIG. 2D and FIG. 2E illustrate setting up and using ACR in a situation in which the user specified many dates in the Formulaic Data.

FIG. 4A, FIG. 4B, FIG. 4C and FIG. 4D example setting up and using top row insertion ACR.

FIG. 11A, FIG. 11B, FIG. 11C and FIG. 11D example the set up and use of combined spreadsheet and dashboard ACR.

FIG. 12A, FIG. 12B, FIG. 12C and FIG. 12D example the use of ACR and spreadsheet to more flexibly replace batch or real-time applications.

DETAILED DESCRIPTION

Figure 3C:
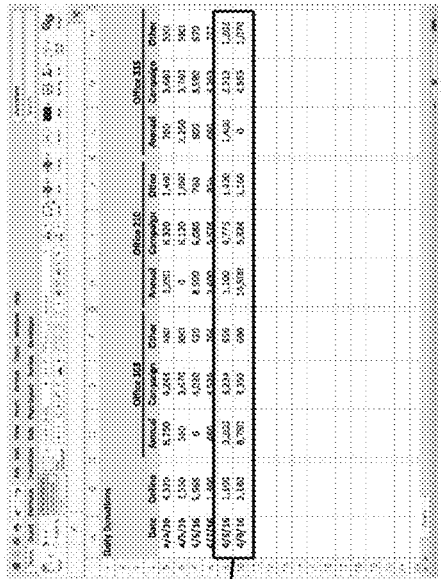
FIG. 3A, FIG. 3B and FIG. 3C example setting up and using Row ACR.

The following detailed description is made with reference to the figures. Example implementations are described to illustrate the technology disclosed, not to limit its scope, which is defined by the claims. Those of ordinary skill in the art will recognize a variety of equivalent variations on the description that follows.

First, some nomenclature to keep straight the use of "spreadsheet". We sometimes use spreadsheet as an adjective to refer to a category of applications or a feature that is common across spreadsheet applications. As examples, we refer to Excel as a spreadsheet application and we refer to spreadsheet cells. When it comes to files, we mean to be more specific. Microsoft's Excel glossary uses "workbook" to refer to a spreadsheet file that can contain multiple worksheets, which have separate tabs in the user interface. One of the display options in Excel is to display multiple window panes showing different worksheets within a single workbook. Consistent with this terminology, we distinguish between a worksheet/tab and a workbook/spreadsheet. We sometimes refer to a worksheet as a tab, based on its appearance. When distinguishing between tabs and spreadsheets, we use spreadsheet to refer to the larger container that can hold multiple worksheets or tabs.

When spreadsheet applications were first created, they electronically emulated tabular paper spreadsheets. More recently, Microsoft Excel, Google Sheets, Apple Numbers and others have dramatically increased the breadth of capabilities and usefulness of spreadsheets. Spreadsheet applications now access data across a wide variety of sources including relational, structured and semi-structured, open data protocol (OData), Web and Hadoop among others; and these applications manipulate data—such as in pivot tables and via Microsoft PowerPivot. Additionally, spreadsheets have extensive functionality for creating charts with SmartArt and for building forms, and they even have programming languages embedded within them, such as VBA (Visual Basic for Applications in Excel), Apps Script (in Google Sheets) and Apple Script (in Apple Numbers). In one example, Microsoft Excel includes more than four hundred and fifty built-in functions.

With all the added capabilities, spreadsheet applications have become substantially more complicated. The data manipulation and embedded programming language capabilities can be very powerful, but are complicated to learn and therefore they are used by a very small fraction of the spreadsheet application user base. Well over a hundred books and online videos have been published to help users understand capabilities of Excel alone.

With the world moving to the use of more and more data, and bigger and more complicated data sets, there is a need to enable the spreadsheet applications to handle many large and complex data sets. Regular users have not wanted to learn the complicated capabilities, such as those in Microsoft Excel Power Query and PowerPivot, required for importing moderate sized data sets into their Excel spreadsheets. Many users would love to be able to handle data sets larger than the row or column constraints of their spreadsheets and to be able to more easily manipulate the large and sometimes messy data sets. Most users want to do this while learning as few new commands as possible, with large external data set usage as simple as using small sets of data in their spreadsheets today.

The formulaically defined non-spreadsheet cell (NSC) data variables and related technologies disclosed in "Methods and Systems for Connecting a Spreadsheet to External Data Sources with Formulaic Specification of Data Retrieval" filed concurrently, allow users to work with all types of numeric and text external data sets much larger and more complex than can currently fit in traditional spreadsheets. This external data connection creates the foundation for users to automate spreadsheet work without the use of embedded programming languages or special prebuilt data feeds, taking spreadsheets from a tool users employ to conduct one off or routine analytics to a real-time competitor of systems that automate repetitive activities.

The disclosed technology allows users to create automatically replicating cells, blocks of cells, rows, columns, worksheets, charts, Word documents and dashboards. Users can create spreadsheets that do real-time computing, send results to people and other systems for use as seamlessly as would be the case if the results came from a custom or packaged software system. The disclosed technology extends the automation described in "Methods and Systems for Connecting a Spreadsheet to External Data Sources with Formulaic Specification of Data Retrieval" to presentation applications as well, to include the automatic replication and generation of presentation pages and charts with new information.

The disclosed capabilities will make it possible for spreadsheets and presentations to be automatically replicated on a real-time, daily, weekly, monthly or other basis without the need of human work. The disclosed technology also shifts spreadsheets and spreadsheet cell formulas into replacing real time computing software, allowing users of spreadsheets to become the equivalent of batch or real time system programmers, with their spreadsheets receiving and automatically acting on batch or real time data and with the ability to share batch or real time outputs. Thus, the disclosed technology extends the options for regular users of spreadsheets, working with their spreadsheet cells with their formulaically defined NSC data variables, into broad based batch and real time applications. This creates many possibilities of ways a user can set their spreadsheet to automatically respond to changes. Disclosed technologies that allow users ways to tailor automated responses to their situational needs are described supra.

Figures 1A, 1B, 1C, 1D:
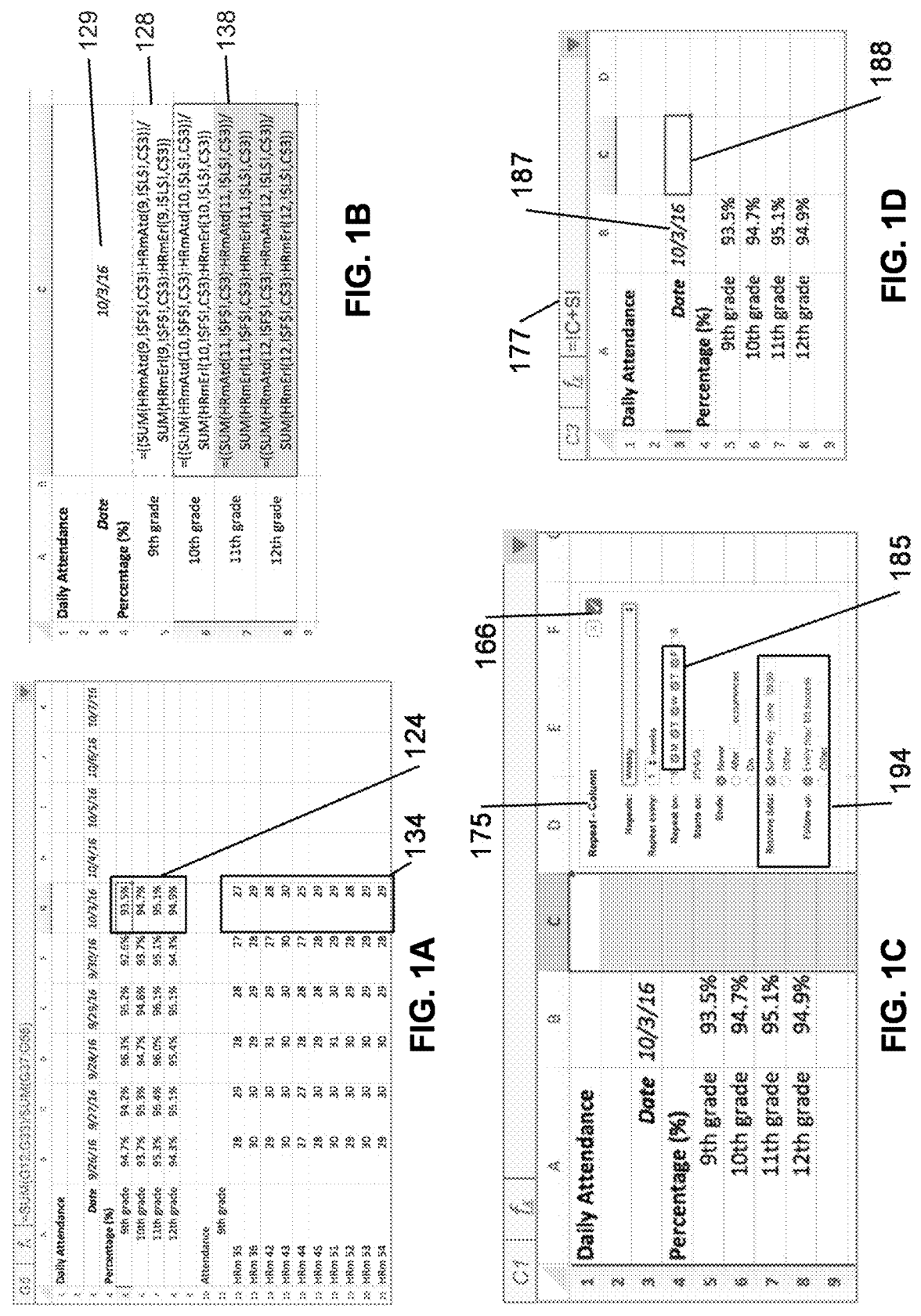

In FIG. 1A we start with a very simple version of a common occurrence, a user creating a column of information in a spreadsheet every day. In this example, the user is a High School Administer who tracks and reports out the daily percentage attendance by grade. The data to do the calculation is electronically recorded in the user's School system but the desired report calculations and format have not yet been programmed into that system. Therefore, the user looks up the attendance and enrollment data each day, after each Home Room teacher records it, and inputs the attendance and enrollment values into cells 134 and a hundred plus additional cells below. The users then copies the calculation in cells 124 to the row for the current day and has their report.

If instead that Home Room and attendance data was available to the user's spreadsheet with our Formulaic data capability and the Auto Cell Replication (ACR) capability of our current invention, then all the work we just described could be automatically done. The user would need to do two things. First rewrite their calculations using our Formulaic Data capability and then second turn on the column version of our Auto Cell Replication (ACR).

In FIG. 1B the user starts by creating the formula in cell C5 128 with our Formulaic Data capability, which the school system now has been set up to feed, so the daily attendance and enrollment data can be automatically fed each day to the user's spreadsheet. That formula then sums the Home Room by Home Room attendance and enrollment for all the 9th grade students. The attendance is then divided by the enrollment to give the percent attendance each day. The formula in C5 128 uses the date 'Oct. 3, 2016' in cell C3 129 to specify which Formulaic Data to use in the calculation. The user then copies cell C5 128 it to the three other cells, C6, C7 & C8, 138 that calculate the desired Daily Attendance percentage for the other grades. With a quick find and replace of the 9th grade, with the respective grade for each line, the user now has all of what they need to generate the desired attendance percentage for the four different grades.

In FIG. 1C the user does the second step which is to then turn on the column ACR for future days. In this embodiment, they do that by a special Repeat-Column copy and paste using the pop-up 175. In that pop up, they specify a special weekly repeat highlighting that the ACR run on Monday, Tuesday, Wednesday, Thursday and Friday via their selections in 185. In this example, the user also specifies when to check for the data 194 and what to do if it is not there. That could be preset when the data connection is set up and therefore not need user actions. By then checking 166, the completion box on the pop up, the user accepts their selections and the worksheet is now ready to auto generate their desired report. The user can take a quick look at the ACR formulaic results as shown if FIG. 1D where the user has highlighted cell C3 188 and sees the hidden formula '!C+S!' in the formula box 177. The formula shows our syntax for this function that tells the user how the application will increment the date in cell B3 187. The '! !' are the indicators used in our system to show the user this is a special Formulaic Data Non-Spreadsheet Cell (NSC) command. The 'C+S' tells the user that it is a Column Auto Cell Replication (ACR) with a Special time increment. Had the 'C' been by itself then that, in this embodiment, would be the system default of one Day time increment. With the ACR now set up each day of the week the system will auto-generate that day's report.

The ACR capabilities auto replicate every formula in an ACR specified cell. They will duplicate any text and replicate formulas and values in cells with and without Formulaic Data. Given the manual nature of the all the work done by the user in FIG. 1A our ACR will save the High School Administer a lot of work each day.

In the example in FIG. 1A through FIG. 1D the ACR date increments were working on a date field. They worked from a calendar and incremented Tuesday through Friday by one day in retrieving the data and then to get the values on Monday incremented three days to miss the weekend. The system also increments date specific Formulaic Data variables such as data sets that have date/time as a key, thereby specifying the Formulaic Data to be selected. Our technology will work for non-keyed variables if date/time is a field in a row that is then used in a formula or a Formulaic Data retrieval.

Figures 2A, 2B, 2C, 2D, 2E:
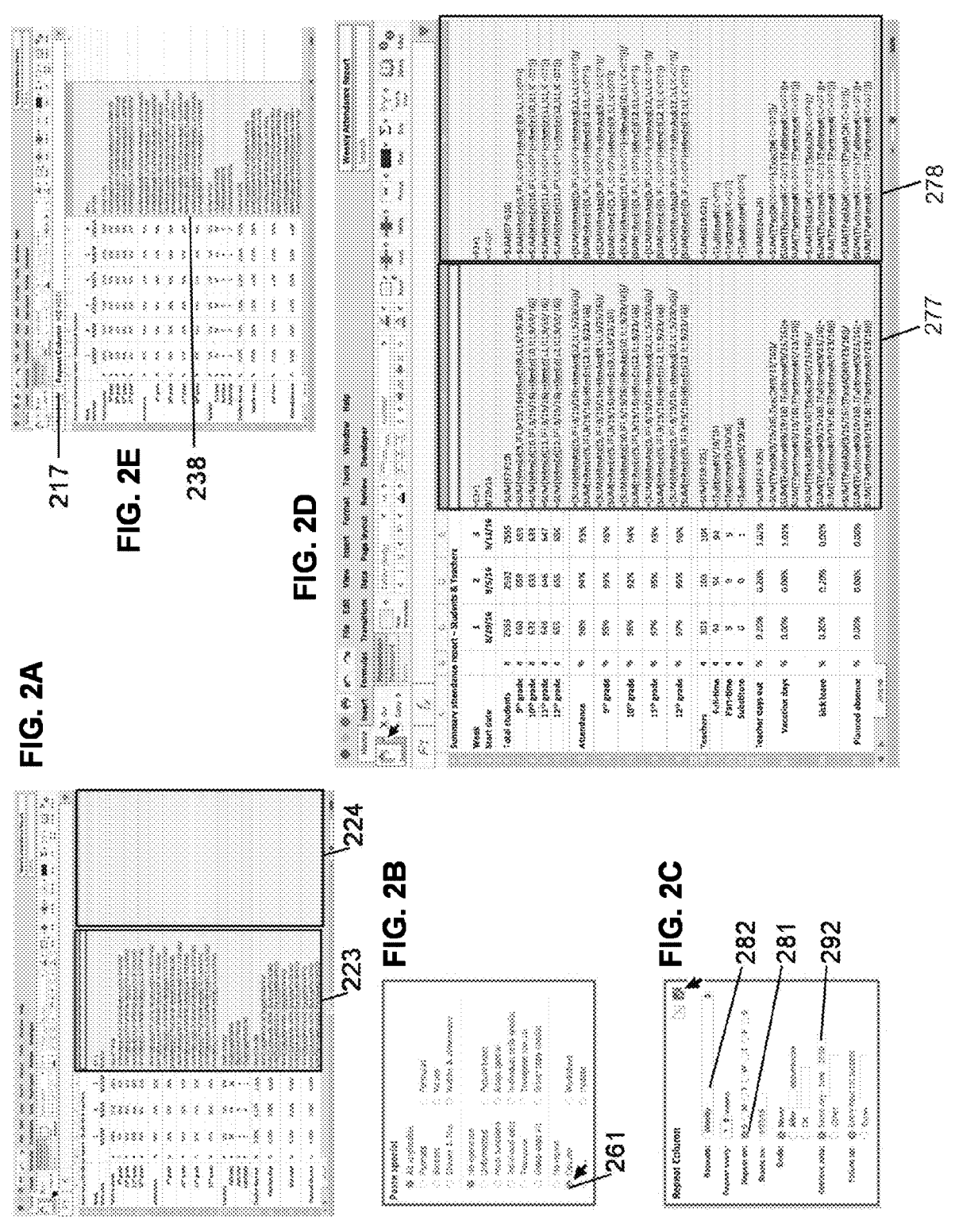

FIG. 2A shows the use of our technology in the situation where a user has constructed Formulaic Data specifying the dates throughout the Formulaic Data formulas and cells, rather than using a single date reference cell. The user highlights the column 223 they want to automatically repeat and highlights the paste destination column 224 and selects a special paste getting the pop up in FIG. 2B. In the FIG. 2B pop up the user selects Column repeat 261 and gets the Repeat Column pop up shown in FIG. 2C. In that pop-up they select a 'Weekly' 282 ACR which runs on their selection of Sunday 281 at '22:50' 292. The application then shows them the ACR original formula in FIG. 2D column F 277 and the time repeating ones in column G 278. In the ACR column, what they see are the dates replaced by the ACR time increment highlighted in red text—in this example !C+D7!. This tells the user it is a Column ACR with an increment of 7 Days working off the previous column comparable date. In this embodiment, for any ACR column when the user switches it to formula view they will see both the original column F 277 and the ACR date setup for the column that they sought to see the formulas. That way they understand the original calculation set up and also the ACR set up. FIG. 2E shows another way to view the formulas and ACR settings, it shows the formulas in the highlighted column 238 with the actual date used and the ACR set up in the Formula bar 217, in this example changed to a white fill (vs. a regular fill of light grey typically used in this embodiment) so it is more visible to the user.

Figure 3A:
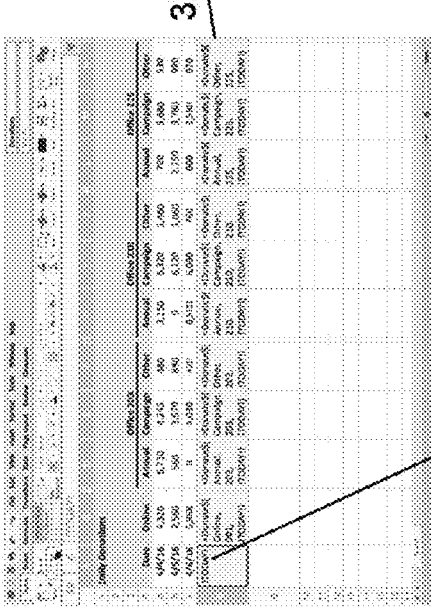
Figure 3B:
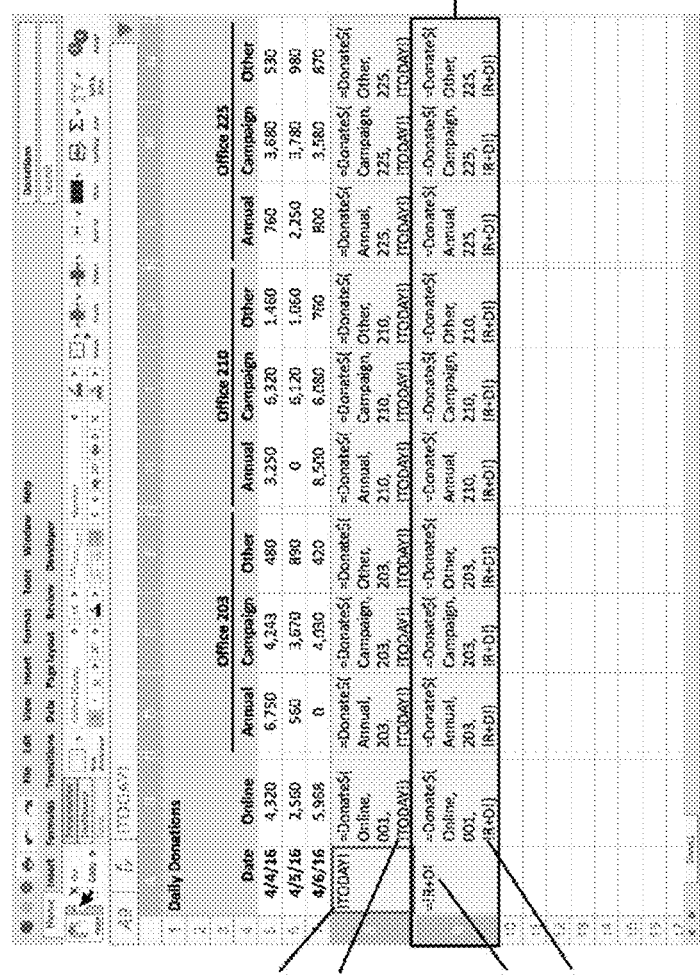

FIG. 3A shows a user setting up a row-driven daily report they would like to have automatically generated, via our ACR technology. The user wants to add a new row for each new day so they highlight the bottom row 323 and do a Repeat row daily paste in the pop ups like those done in FIG. 2B and FIG. 2C. This example shows a Formulaic Data date related command used for selecting today's data. The !TODAY! 321 function sets that value at today's date for use in cells, cell formulas and our Formulaic NSC data variables. FIG. 3B shows the !TODAY! command being used in a Formulaic Data variable, '=Donate$(Online,001,!TODAY!) 374 specifying what 'Donate$' value to retrieve from the cloud data set. In row 8 375, the row where the ACR has been set, the user can see the ACR set up, which in this example is !R+D!. The R is for Row ACR and the D is for Daily auto replication, which is separately shown in this example because 1 day is not the default set up in this implementation. The !TODAY! function is then used as the starting point for the Row ACR in multiple modes. In A8 363 '!TODAY!' is used as a date function ACR starting point for cell A9 383. In B8 !TODAY! 374 is used as a data function Formulaic Data variable ACR starting point for B9 384 which then adds one day to the previous date. FIG. 3C then shows the result two days later after two rows 337 have been generated automatically.

Figures 4A, 4B, 4C, 4D:
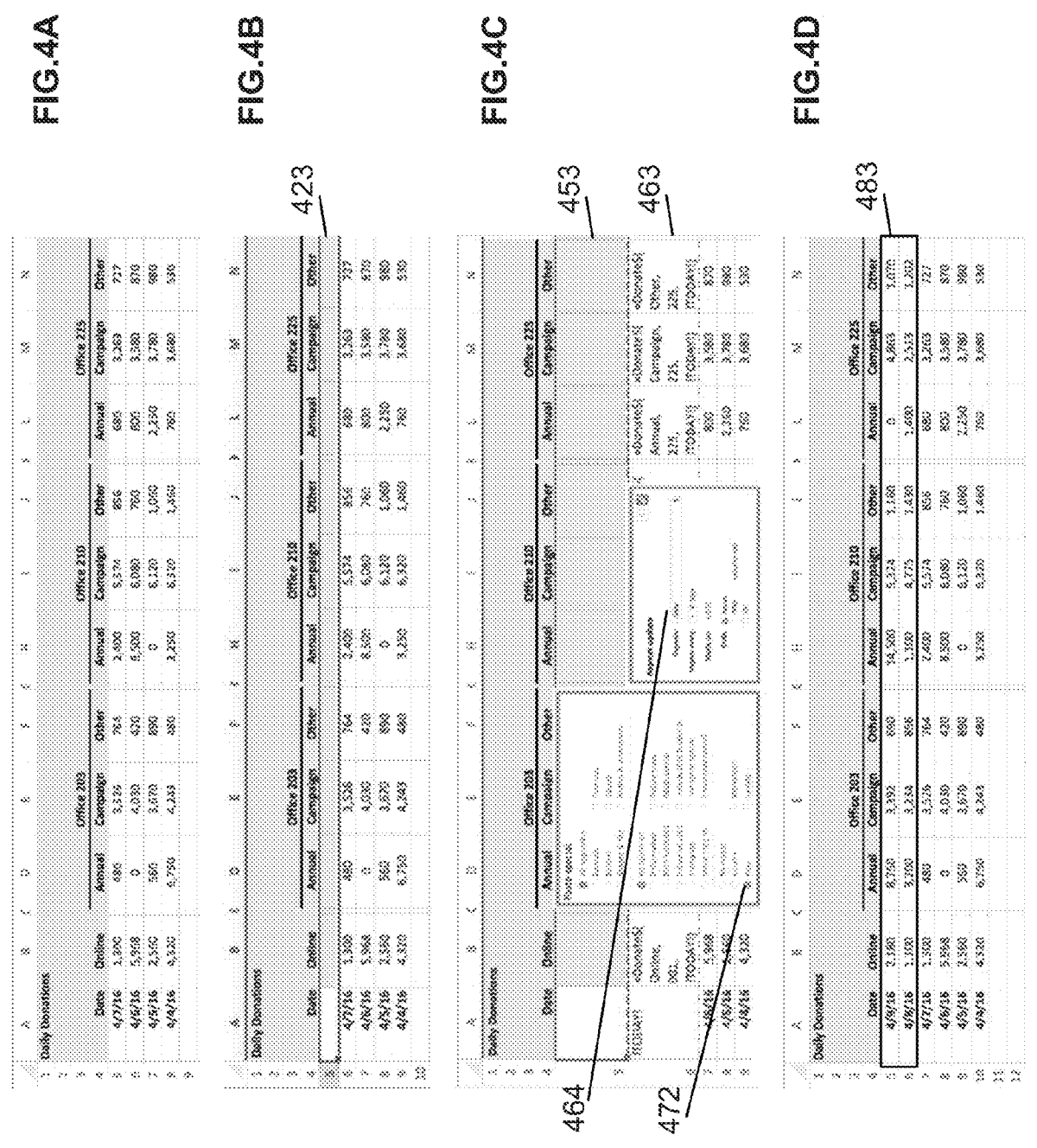

FIG. 4A shows the user working with a different version of the spreadsheet in FIG. 3A where the data is presented with the most recent day at the top row rather than the bottom row of the worksheet. The user would like to replicate that layout with our ACR capability. In this embodiment of our technology, the user can then insert a blank line 423 as shown in FIG. 4B. The user then does a special copy and paste, as shown in FIG. 4C where the user highlights for copy the top row of calculations, row 6 463 also exposing the Formulaic Data. They then highlight the blank row they created in FIG. 4B which in FIG. 4C is row 5 453 and select the Row repeat paste 472 with the Repeat set to daily 464. Then our spreadsheet technology will automatically deliver new rows with the new data each day coming in as the top row and shifting the previous rows down to accommodate the new data, as shown two days later in FIG. 4D, showing two days of ACR generated data 483.

Users can do a similar approach for Column ACR, inserting the newest column as the first column of data and shifting the preceding columns to the right. Users can also have more than one row or column, as desired by the user, replicate each time-period. Users may have situation where there are a number of rows or columns calculated each day and wants them as a group to be added to the current set or shift the current set. Users may also want to have a fixed view each time-period and our technology can accommodate that. For example, a user may want a weekly version of FIG. 4A which shows only the days of a week and will then max out at seven days before starting back over on the next week. Our technology supports the creation of many different presentation variants of the ACR generated results.

Figure 5A:
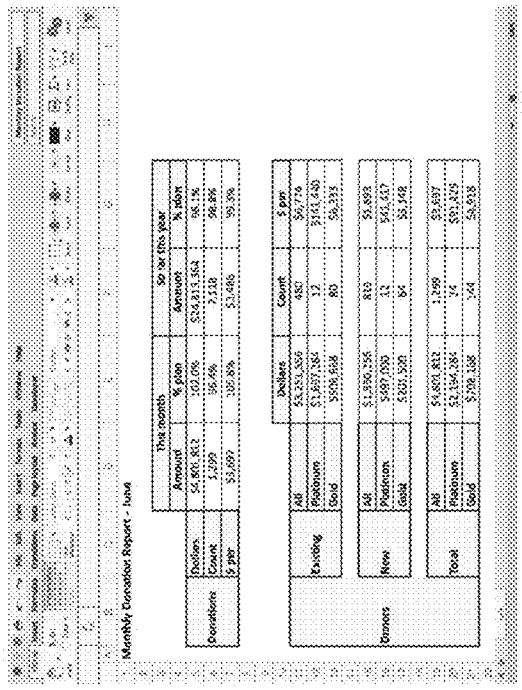
FIG. 5A, FIG. 5B, FIG. 5C and FIG. 5D example setting up and using worksheet ACR and the updating capability.

Our ACR technology can similarly be set up to automatically replicate entire worksheets at the specified time-period. Our ACR technology can also be set up and turned on before creating the spreadsheet content. FIG. 5A examples a user setting up an ACR worksheet repeat replication using ACR pop up boxes 523 and 533. In those pop-up boxes, the user has selected Monthly replication on the last day of the month. They set this up before building any of the cell content. The user then built the full report in FIG. 5B which includes titles, formatting, headings, use of formulaic data, and use of both regular and our Formulaic Data formulas and functions. All of this will then be automatically replicated with next month's data and then a new worksheet created with the that month's data.

Figure 5B:
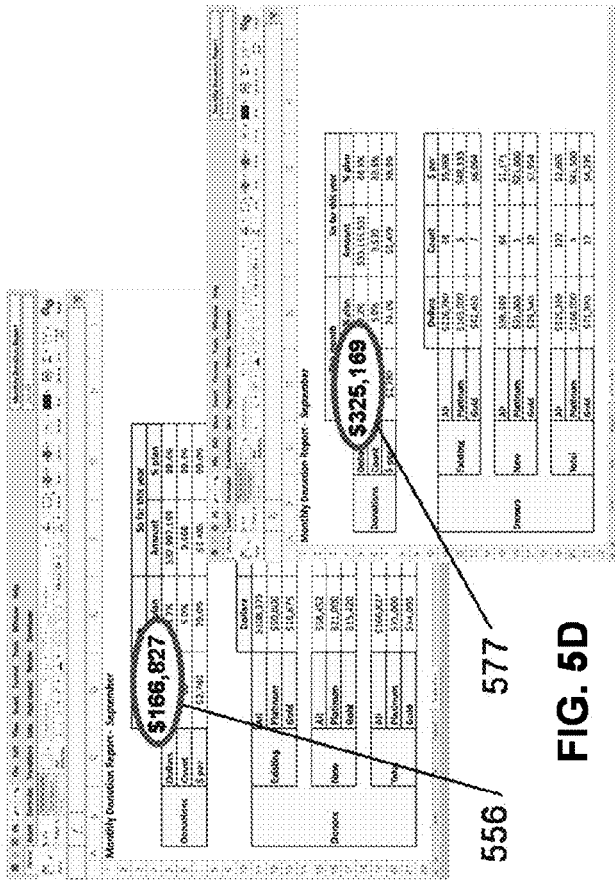
Figure 5C:
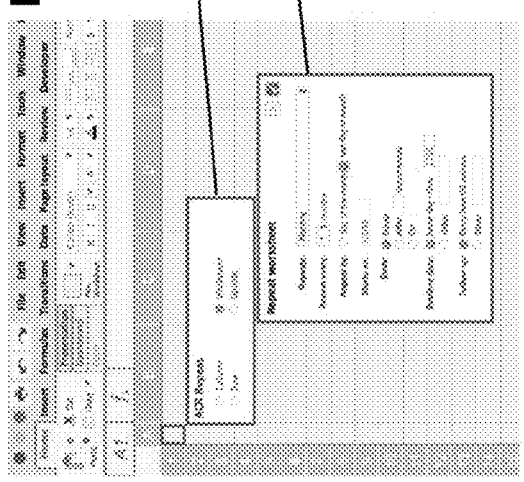
Figure 5D:
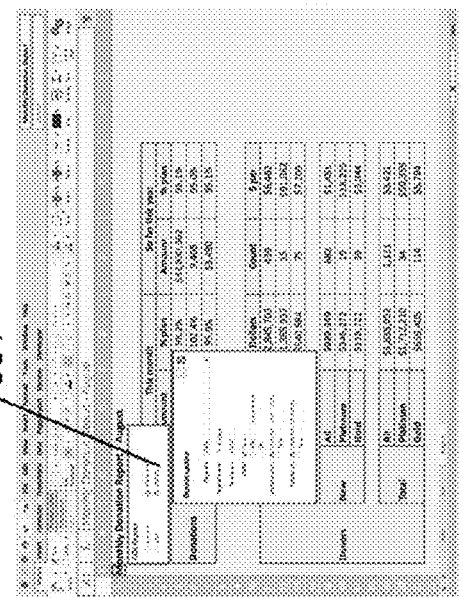

FIG. 5C then shows the user employing a very helpful additional type of our ACR. It is called the Update version as it allows a user to not only automatically replicate a worksheet, row, column or other set of our spreadsheet cells at the specified time-period, but to do intermediate updates at specified or continuous real time intervals. The user in FIG. 5C selected it by also checking the Update selection 561 and then in this example selecting a daily update to this monthly report. This will result in not waiting until the last day of the month to create what is shown in FIG. 5B but instead starting on the first day of the month generating the report and then each day replacing the values in the report with the results from rerunning the report. FIG. 5D shows the first two days of that report and in the magnifying glass you can see how the values have changed for cell D5 on the first day '$166,827' 556 to '$325,169' 577 on the second day. In this example, this allows the user to each day see how they are progressing without needing to write an additional set of calculations and a new report.

Figure 6A:
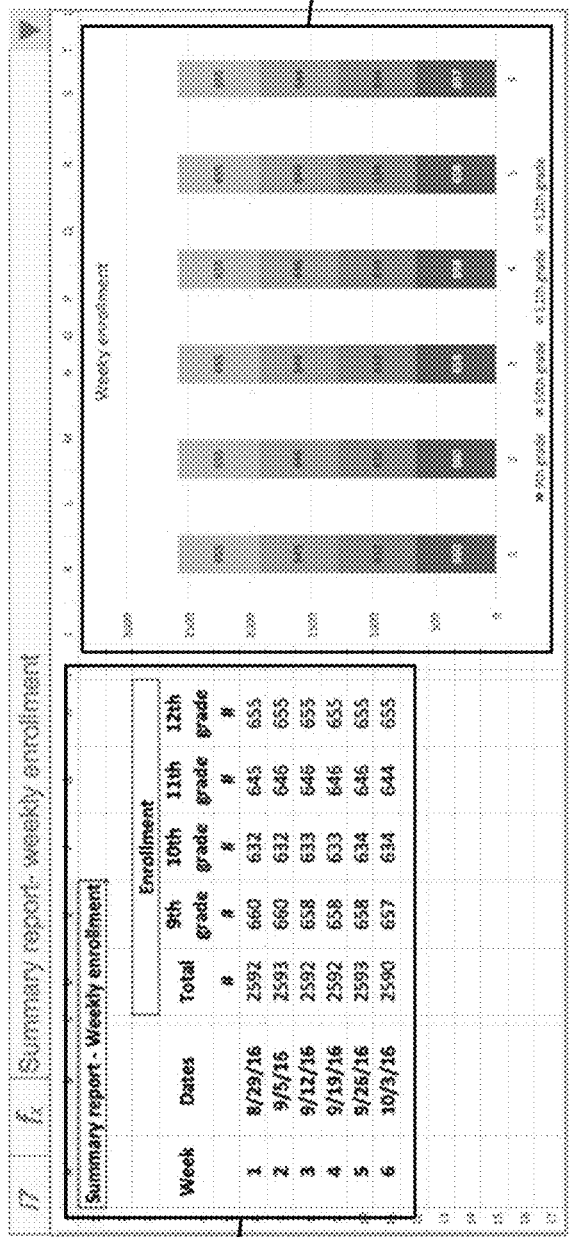
FIG. 6A and FIG. 6B show the use of combined Row and Chart ACR.
Figure 6B:
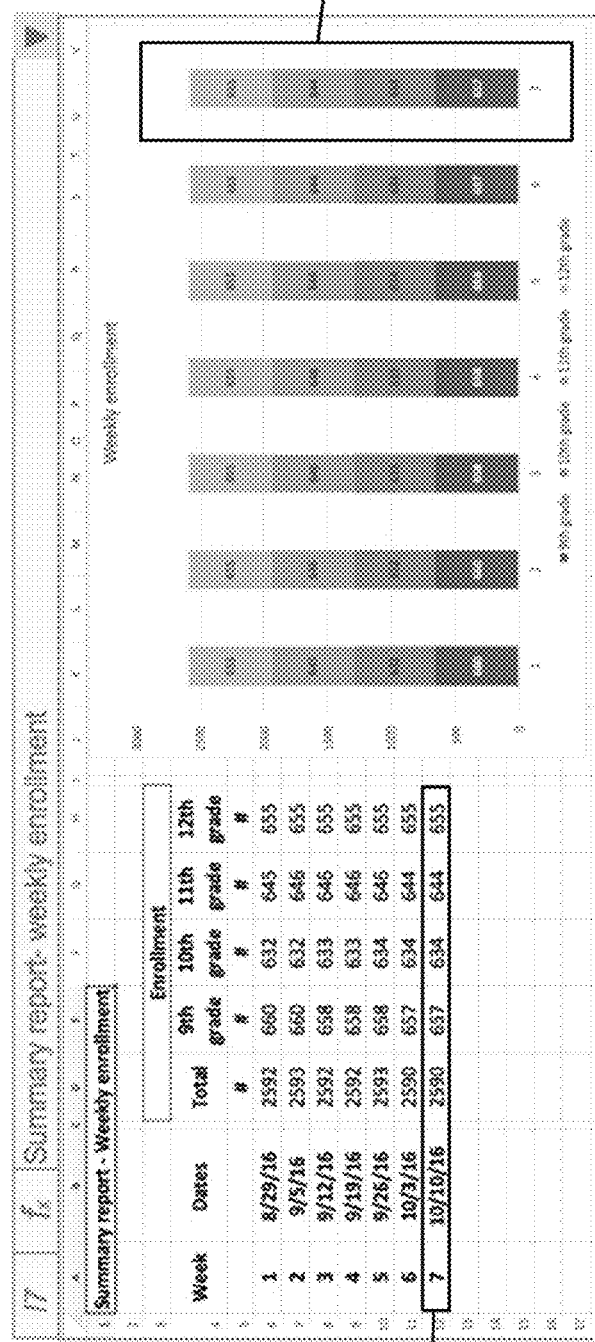

FIG. 6A examples our ACR technology auto-replicating charts, which have been generated using our Formulaic data. In this example, the user created the spreadsheet cells in 632 using some of our Formulaic Data variables and then generated the chart in 646 from those cells. The user then employed the row version of our ACR technology for both the rows in 632 and the chart in 646. Thus, when the ACR auto-generates the next row 682 in the spreadsheet shown in FIG. 6B it also ACR auto-generates the next bar 679 in the chart that corresponds to the row 682. In this example, since the user employed the weekly ACR, each week the ACR will add a new row such as 682 and a new chart bar 679. However, like we discussed before the user can set a number or rows and/or bars at which point when it generates a new one it stops showing the oldest.

Figure 7:
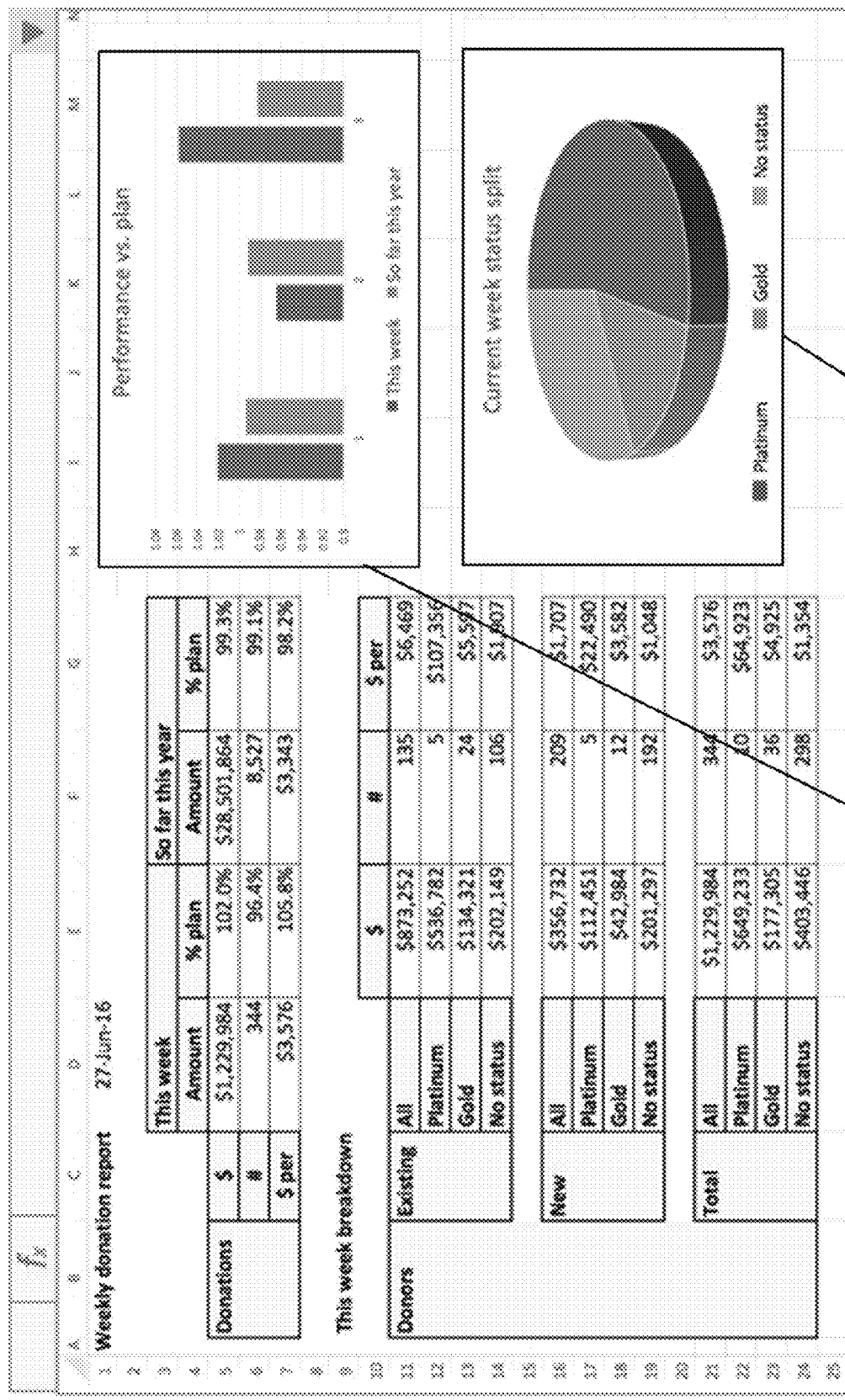
FIG. 7 illustrates multiple-chart ACR.

ACR can also auto-generate complete worksheets with more than one chart. FIG. 7 shows a Worksheet created with monthly ACR including two different charts 737 and 767. In this example, both of those charts will be auto-generated with the rest of the worksheet content each month using the Formulaic and other data specified by the spreadsheet. Then that worksheet will be available to the user in a worksheet tab with a naming convention selected by the user.

While the commands and syntax employed to setup the ACR could be very different, there is huge power to allowing spreadsheet users to use spreadsheet cell commands to automate time determined creation of new spreadsheet worksheets, rows, columns, cells and charts. Any time-period could be selected, and will work provided the underlying data updates at least that frequently. In the case of spreadsheet cells with Formulaic data that updates at different frequencies, an option could be set that provided at least one data element updates within the specified time frequency the user could specify to let the ACR run with only part of the data updating.

Default ACR time periods could also be automatically set up based on the frequency of the data refresh and therefore the user doesn't need to specify an ACR time update if they are happy with the default set for the Formulaic data used. ACR could also be set up so that rather than time based it is triggered by change in the Formulaic data used in the row, column, worksheet, chart or specified cells. This option would then, in this embodiment, be identified first by the type of spreadsheet replication, Column, Row, Worksheet, or Other and then the time-period or Change. So, the ACR indicator for Change would be in this embodiment exampled as !W+C! for a Worksheet that auto-generates when the data in the cells Changes.

Our ACR capability disclosed could also be used for a real-time or near real-time spreadsheet, provided the NSC data used by the spreadsheet cells updates on a real-time or near real-time basis. It would use a flavor of our Change ACR version that gets very frequent updates. While there are many technical ways the data feed could work, for example only sending changes to the spreadsheet data sets when they occur, or using the spreadsheet idle time to do updates, the user set up of the capability would be made very simple for user to set up with spreadsheet cells without having to work with an embedded programming language.

Figure 8A:
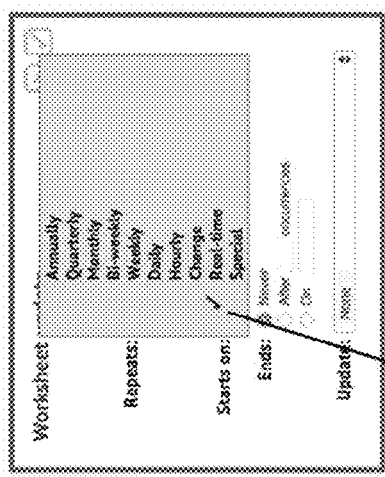
FIG. 8A and FIG. 8B example the set up and use of real-time ACR.
Figure 8B:
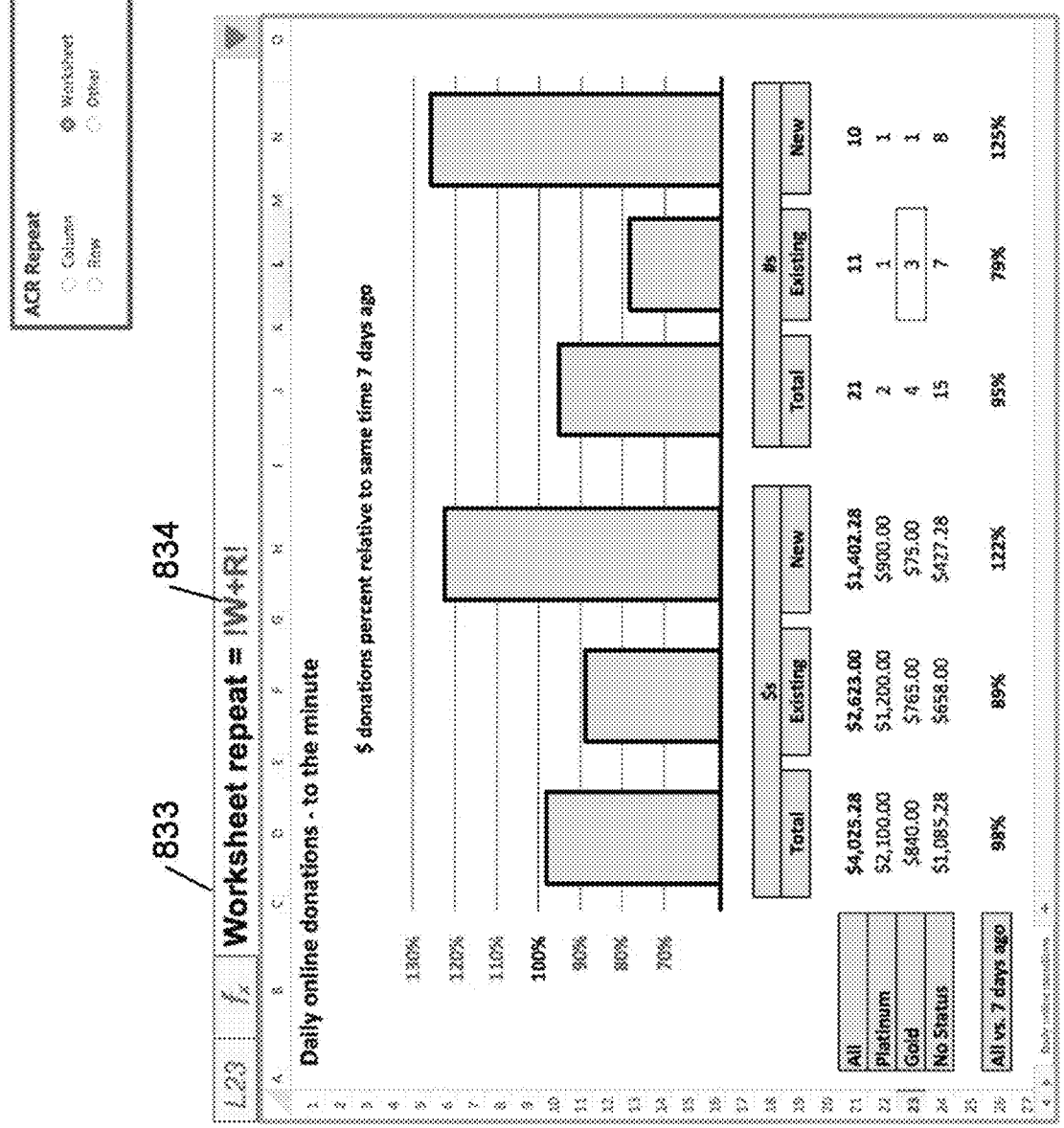

In this embodiment, the real-time Change ACR set up is like the Date ACR set up in a set of pop ups in FIG. 8A. The user has selected Real-time 818 for the period of Repeat. Once this is done, when the user checks the ACR set up for a cell the ACR set up will show up in the Formula bar 833 as shown in FIG. 8B. In this example 'Worksheet Repeat=!W+R!' 834 shows up in the Formula bar 833, where the W is for the Worksheet and the R for Real-time.

Our automated replication can be extended beyond spreadsheet cells to those "atomized" spreadsheet cells incorporated into presentation pages via the technology disclosed in one of the related patent applications.

Figure 9:
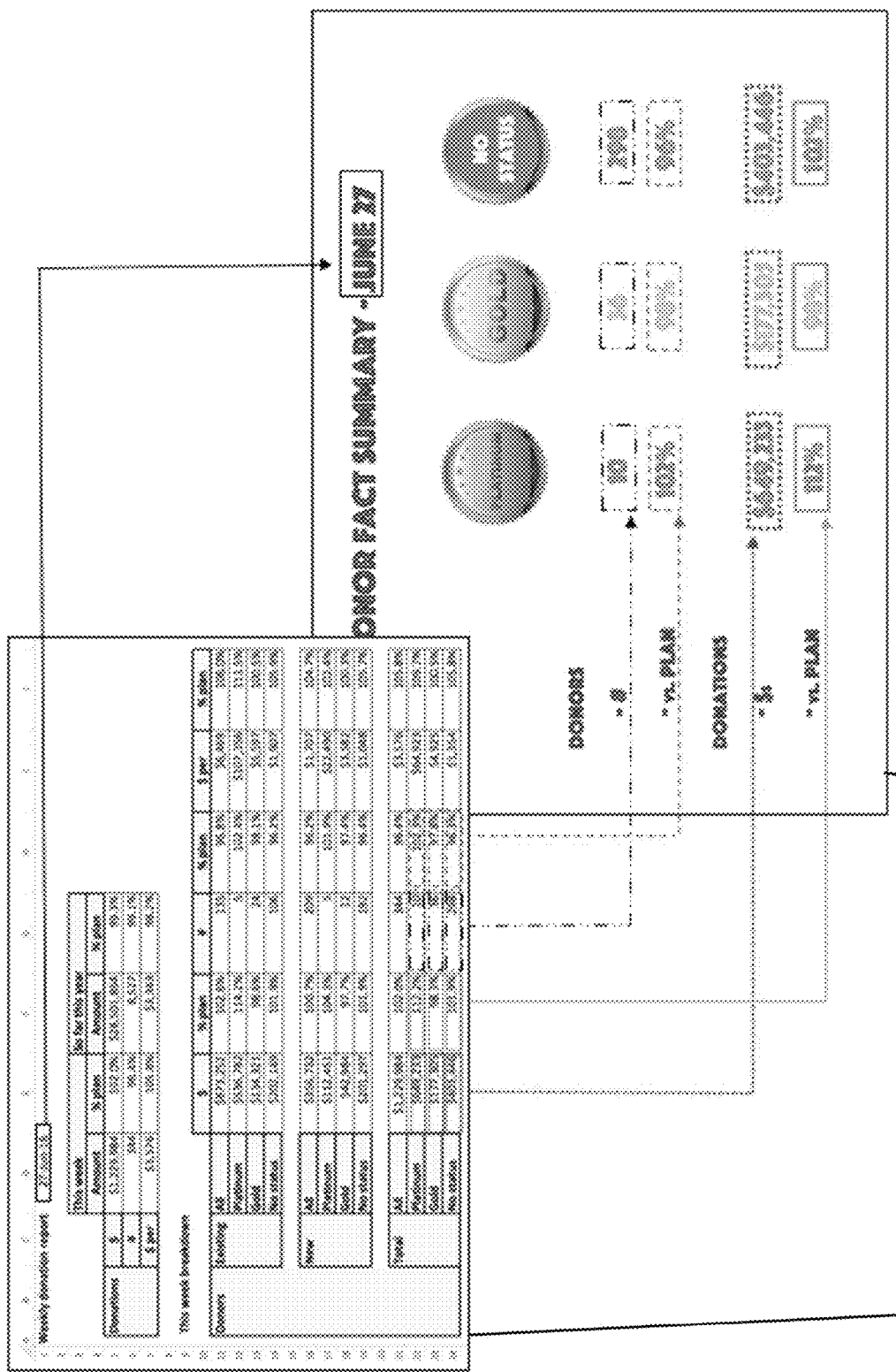
FIG. 9 examples combined spreadsheet and presentation page ACR.

FIG. 9 shows a presentation page 967 created using cells from the spreadsheet 934. The spreadsheet cells are a version of the charity 'Weekly donation report' which has been created with a weekly ACR, so they will automatically generate a new version worksheet every week. Thirteen of the spreadsheet cells from 934 are replicated to the positions shown in presentation page 967 via the technology in one of the related patent applications. Using the technology disclosed in this application the ACR settings can then be extended to the presentation page for the spreadsheet cells and then a related version of ACR can be turned on for the other presentation page content so that in this example the user can select to create an entirely new presentation page 967 each week or to change the values within the existing page to the latest values.

Figure 10:
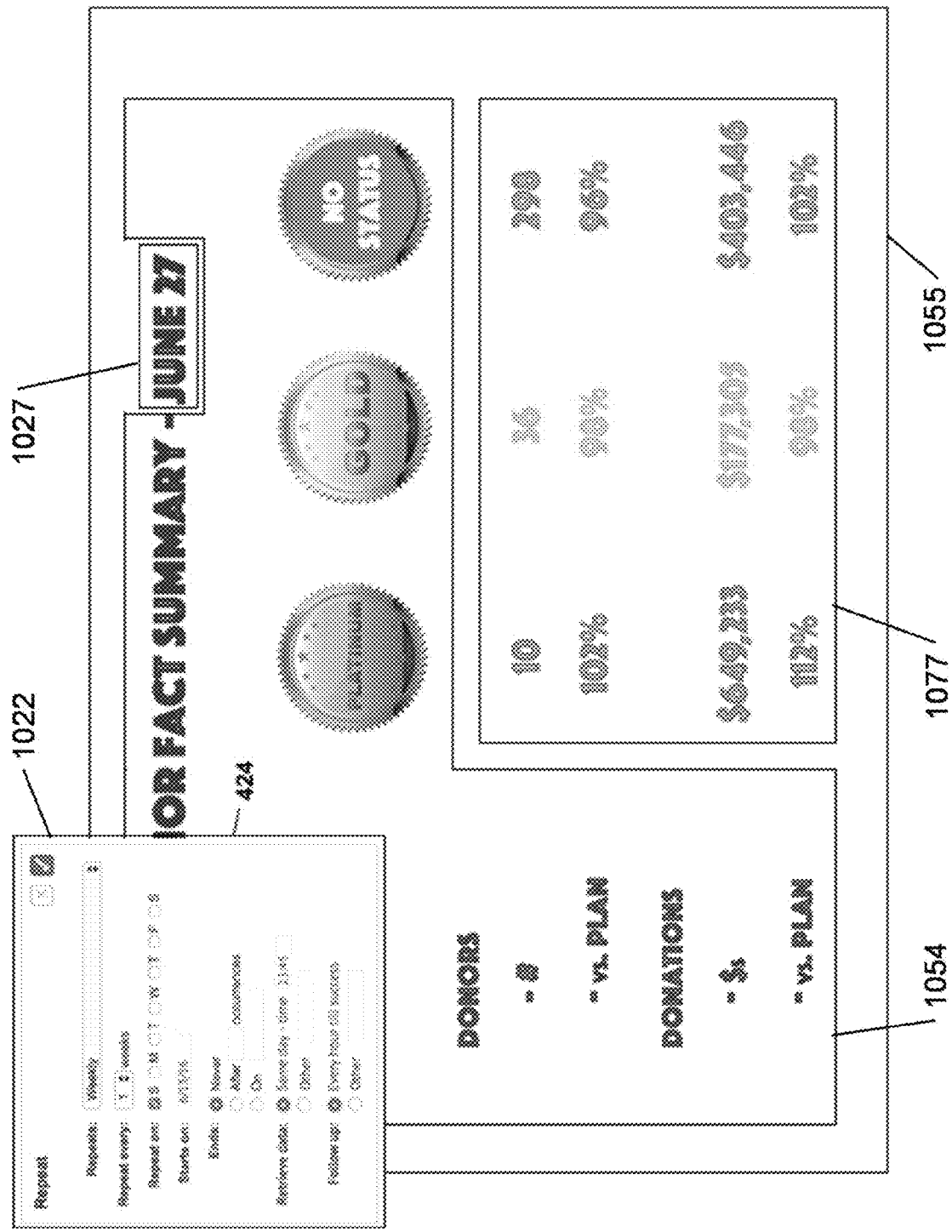
FIG. 10 examples turning on ACR within a presentation page.

Had the spreadsheet cells copied into the presentation in FIG. 9 not had ACR turned on, in our technology ACR could be turned on in the presentation. That is because, in this example, at least one of the cells has our Formulaic Data that will change on time or other increments. The user can use modes comparable to the pop-ups, like 1022 in FIG. 10 or incorporating date ACR variables in the cells on the presentation pages and then extending those settings to the non-cell data on the presentation page. This will then make a new copy of the page content 1055, with the ACR spreadsheet cells using the data at the time set for the auto-replication. In this example, the presentation page does the calculations in the twelve cells in 1077 and a thirteenth cell which is in 1027. This page also replicates the non-spreadsheet cell derived content shown in 1054. The ACR created a new page, like the one in FIG. 10, that will be dated for the week when the ACR runs and use the data for that week. This page will continue to automatically generate a new page each week, with the latest dataset, as specified by the user.

This ACR replication capability works for multiple pages and a complete presentation document as desired by the user. When the technology is applied to an entire document, it will then auto-generate pages that have no Formulaic data such as agenda pages, to complete the document.

The same spreadsheet and presentation ACR capabilities can be used for creating real-time or other time-period refreshing dashboards. FIG. 11A shows a spreadsheet with a set of blue highlighted cells 1123 that are then deposited on a dashboard page 1136 in FIG. 11B. Those spreadsheet cells are set for real-time change replication and those ACR settings are retained in the Dashboard. In FIG. 11C the user then repositions and reformats the spreadsheet cells 1173 and uses them to generate three different charts, 1163, 1164, and 1188—that will also ACR auto-generate as the data changes. Finally, in FIG. 11D the user adds the additional text and formatting they desire and they are left with a real-time dynamic dashboard that in this example shows the online donations for a charity compared to the same time on the same day the previous week. This dashboard, in this example, will then reset for the next day and continue to give the user a daily dashboard.

The capabilities previously described for presentation and dashboard pages and their integration of spreadsheet cells also works in word style documents, forms and data visualization tools. A user could employ our ACR to custom tailor user forms to specific days of the week or how results are actually trending, using the Formulaic Data to fine tune and change what is presented to the form user.

Our Formulaic Data, ACR and SHARE (described in one of the related patent applications) capabilities can be combined by users to employ their spreadsheets to be batch or real-time application replacements. FIG. 12A through FIG. 12D example one such setting for the Charity we have previously discussed. They have a process that runs every night where separate Bank systems let them know their daily account receipts by source and different Charity office. Once they have received those balances they want to decide their appropriate Cash balance and transfer the remaining funds to their Investment account for each office. They are attracted to the idea of using our spreadsheet for this because they can then easily change the criteria for how much Cash reserves to hold within each office each night. However, since the receipts come in close to midnight this needs to be an automated system, not someone with a spreadsheet and it will allow them to then go away from their blanket rule with the Bank of $25,000 held for each office in Cash reserves.

FIG. 12A shows their set up on the first day of using our technology. The spreadsheet has the 'Starting Investment Balance' and 'Starting Cash Balance' 1222 from the previous night ending balances. It is now ready for the different data inflows from the various Bank systems. FIG. 12B shows the first data inflow of the 'Online' receipts 1233 by office and office account number. Next in FIG. 12C comes in both the 'Mail' and 'Credit Card' receipts 1256, so now all the Bank receipts have been received. At this point the Formulaic data and ACR spreadsheet calculates the ending 'Daily Cash, sets the desired 'Ending Cash Balance', calculates the 'Ending investment Balance' and the 'Account Transfer' 1288 from each office's Cash account to their Investment account. Then our spreadsheet uploads each offices' 'Account Transfer' 1299 back to the Bank system via our spreadsheet Formulaic Data SHARE interface back to the Bank Account system.

Since the Bank used by the Charity in FIG. 12A through FIG. 12D works some part of 6 days of the week, the ACR and Formulaic Data SHARE based account transfers have been set up for a weekly ACR with six of the seven days selected. Thus, our ACR deals with the irregular time periods so that it skips Sunday in this example. Adding the SHARE and therefore sending from the spreadsheet, typically through the web, data to be used in another system does not limit the different possibilities for our ACR operation. It simply requires coordinating it with what the external system expects and needs and adding the typical data checking to ensure a complete transmission to the external system.

This type of user set up in their spreadsheet, without having to use any imbedded programming languages or other interface, opens all sorts of possibilities for regular spreadsheet users to replace software systems with a very flexible spreadsheet alternative. Since our ACR capabilities allow real-time flow of data in and out of the spreadsheet, this capability could be real-time, batch or combinations of the two. The system could be set up to trigger sending answers once certain data or other criteria are met, such as data checks to ensure completeness and integrity of the received data. The data set up would also be controlled through an authorization process to ensure only the desired users have access the this very powerful capability.

These capabilities could be used to also trigger customized documents and email content sent to people. Our charity could use it to construct spreadsheet algorithms that then select different email templates and then populate the template with specific information from a cloud database on each contributor. Since our technology easily combines content from different document types, the user could add customized graphic elements using our selective multi-way replication capabilities with spreadsheet and database information in the tailored emails. Not only could these then be trigger based on sending responses to specific donations or actions, but the charity user could very easily change the templates on a very quick and easy basis. Having the ability to rapidly change what is effectively a real-time or batch application without the need of programmers is adding a powerful capability to our Charity or any other such user.

Data Descriptions

Our technology is structured such that the data sourced from other systems gets connected to or connected and stored in our own Non-Spreadsheet Cell (NSC) database. In that database, the data is structured into our Formulaic Data for it's easy use in our spreadsheet cells (in spreadsheets or in our other documents). That data then gets used, on demand, by the spreadsheet cells as needed by the user or as set up using our Auto-Cell Replication (ACR). In most situations most of that NSC data will be used temporarily in spreadsheet calculations with only small quantities of the NSC Formulaic Data stored in directly in a cell for report display purposes.

Figure 13:
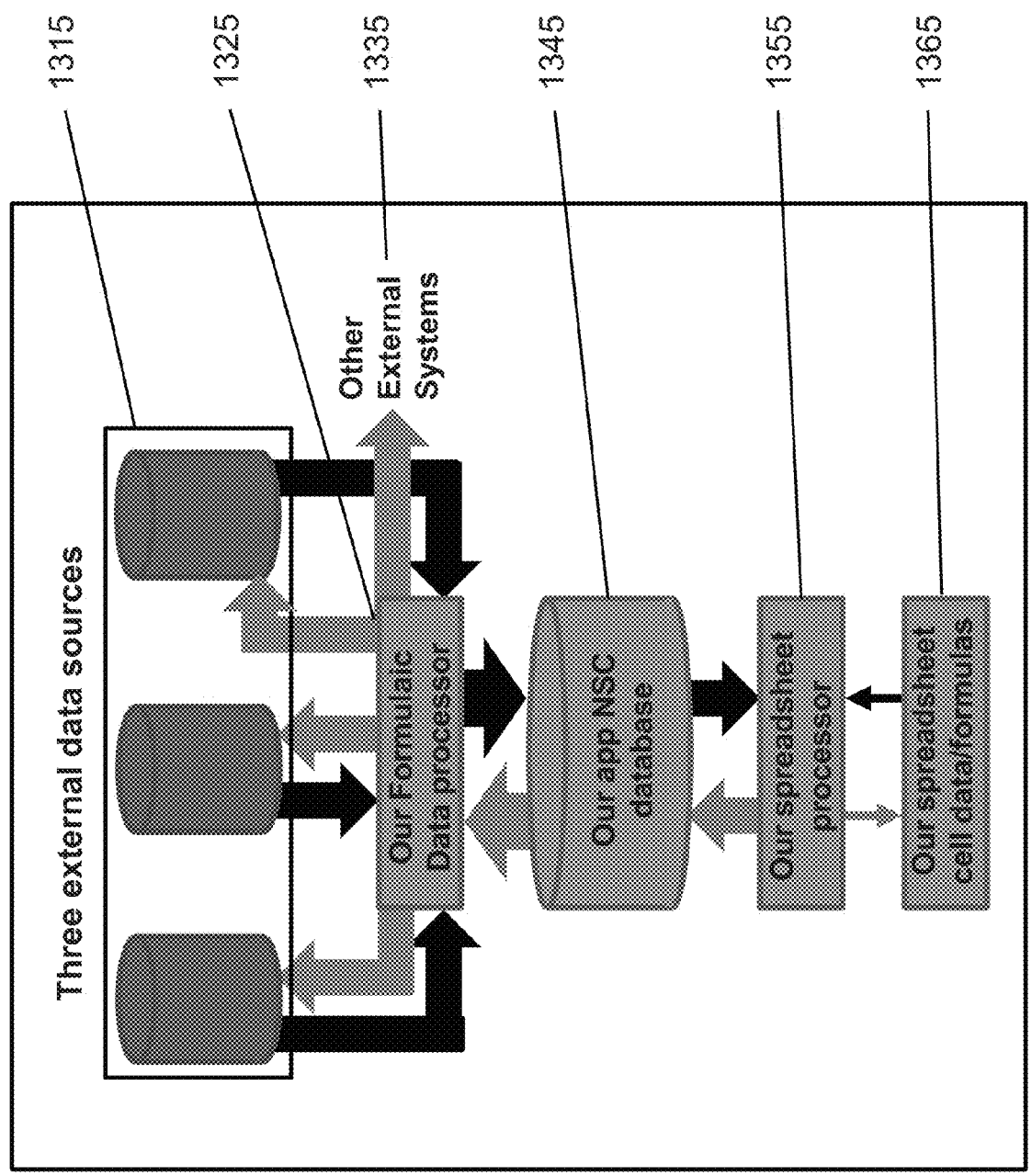
FIG. 13 illustrates an example of Formulaic Data ACR data and processing flow.

FIG. 13 illustrates such a setup, with three external data sources 1315 feeding data into our formulaic processor 1325 that then translates that data into our Formulaic Data syntax for storage in our NSC database and easy use in the spreadsheet cells. There could be many Other External Systems 1335 feeding or receiving data on a one-time, batch or real-time basis. Our Formulaic processor 1325 is also set up to process outbound data from our system using our SHARE capability to any one of the external systems connected to our system.

The Formulaic Data required by a user's spreadsheet cell, in a spreadsheet or in embedded in other documents such as presentations, word pages, dashboards, forms, data visualizers or other documents, is available from the NSC database 1345. Those spreadsheet cells then run their computations drawing in as little or as much NSC Formulaic Data as needed in the spreadsheet processor 1355. That process will also use any spreadsheet held data 1365 and of course all the spreadsheet cell stored formulas and specified functions. In most situations most if not all of the NSC data will be replaced in the spreadsheet processors by the next calculation, however, any data the user specifies can be stored in a spreadsheet cell for reporting or other purposes.

When the user wants to send answers or other results from the spreadsheet to other systems then once the spreadsheet has done the necessary calculations they are sent via to the NSC database 1345 or directly to the Formulaic Data processor 1325 for SHARING then with the external systems 1335 via the connections. This allows user or ACR initiated real-time, batch or some hybrid transfers of spreadsheet generated results to external systems through the use of spreadsheet commands.

Computer System

Figure 14:
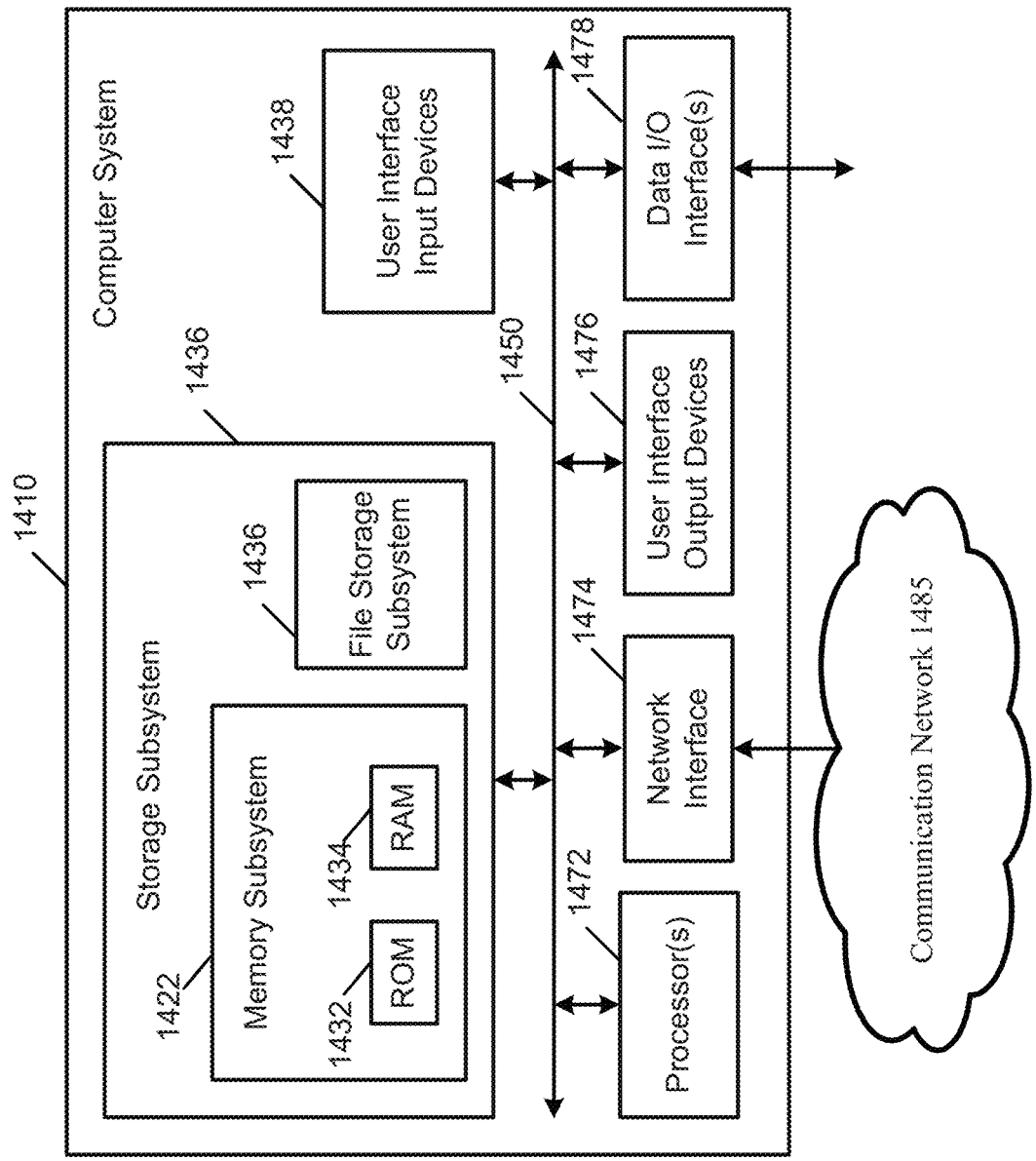
FIG. 14 lays out an example computer system usable for automating creating of new blocks of cells in a spreadsheet and handling data from an external source as formulaic data.

FIG. 14 is a block diagram of an example computer system, according to one implementation. Computer system 1410 typically includes at least one processor 1472 which communicates with a number of peripheral devices via bus subsystem 1450. These peripheral devices may include a storage subsystem 1436 including, for example, memory devices and a file storage subsystem, user interface input devices 1438, user interface output devices 1476, data I/O interfaces 1478 and a network interface 1474. The input and output devices allow user interaction with computer system 1410. Network interface 1474 provides an interface to outside networks, including an interface to communication network 1485, and is coupled via communication network 1485 to corresponding interface devices in other computer systems or in the cloud and usable for cloud applications.

User interface input devices 1438 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1410 or onto communication network 1485.

User interface output devices 1476 may include a display subsystem, a printer, a fax machine, or non-visual displays such as audio output devices. The display subsystem may include a touch screen, a flat-panel device such as a liquid crystal display (LCD), a projection device, a cathode ray tube (CRT), or some other mechanism for creating a visible image. The display subsystem may also provide a non-visual display such as via audio output devices. In general, use of the term "output device" is intended to include all possible types of devices and ways to output information from computer system 1410 to the user or to another machine or computer system.

Storage subsystem 1436 stores programming and data constructs that provide the functionality of some or all of the modules and methods described herein. These software modules are generally executed by processor 1472 alone or in combination with other processors.

Memory 1422 used in the storage subsystem can include a number of memories including a main random access memory (RAM) 1434 for storage of instructions and data during program execution and a read only memory (ROM) 1432 in which fixed instructions are stored. A file storage subsystem 1436 can provide persistent storage for program and data files, and may include a hard disk drive, a CD-ROM drive, an optical drive, or removable media cartridges. The modules implementing the functionality of certain implementations may be stored by file storage subsystem 1436 in the storage subsystem 1436, or in other machines accessible by the processor.

Bus subsystem 1450 provides a mechanism for letting the various components and subsystems of computer system 1410 communicate with each other as intended. Although bus subsystem 1450 is shown schematically as a single bus, alternative implementations of the bus subsystem may use multiple busses.

Computer system 1410 can be of varying types including a workstation, server, computing cluster, blade server, server farm, or any other data processing system or computing device. Due to the ever-changing nature of computers and networks, the description of computer system 1410 depicted in FIG. 14 is intended only as one example. Many other configurations of computer system 1410 are possible having more or fewer components than the computer system depicted in FIG. 14.

Particular Implementations

Some particular implementations and features are described in the following discussion. The technology disclosed can be practiced as a variety of methods, devices or systems, or a computer readable media loaded or impressed with program instructions that, when executed on hardware, cause the hardware either to carry out a disclosed method or combine with the hardware to form a disclosed device or system.

The technology disclosed, in some implementations, involves automating creation of a new block of cells in a spreadsheet. The newly created block of cells can be in columns (FIG. 1-2), rows (FIG. 3-4), tabs (FIG. 5, 7) or whole spreadsheets. They can be in presentations, dashboards, forms or word processing documents, as alternatives to spreadsheets. Or they can be in combinations of spreadsheet cells, charts, presentations, word processing documents, dashboards, forms or data visualizations.

One method implementation includes receiving a user identification of a first block of contiguous cells in a spreadsheet, a plurality of cells in the first block specifying access to first data from an external source using a formulaic data specification of the first data. for more discussion of formulaic data specification, see the related application "METHODS AND SYSTEMS FOR CONNECTING A SPREADSHEET TO EXTERNAL DATA SOURCES WITH FORMULAIC SPECIFICATION OF DATA RETRIEVAL". A formulaic data specification of external data embeds data from the external source in the spreadsheet cell and links it for updates from the external source. The method further includes causing display of a panel of controls that are operable without user input of scripting or macro code, and receiving a user specification of a replication position at which a second block of cells is to be replicated as a variation on the first block. Responsive to the panel, the method includes receiving a user specification of a temporal interval relationship, also referred to as a time interval relationship, between the first and second blocks and receiving a creation trigger parameter for when the second block should be replicated at the second position. After reaching a time determined using the creation trigger parameter, further creating the second block at the replication position and inserting an adjusted formulaic data specification for the second data, based on the formulaic data specification for the first data and the temporal interval relationship between the first and second blocks. The adjustment to the first block formulaic data specification is based on the temporal interval specification.

In some embodiments of the technology, the temporal interval is replaced by a subscription parameter based on the availability of update data from an external source. In some implementations this is denoted by a Change in the data that is used the area being automatically replicated. This selection by the user will then replicate whenever the underlying data changes and was listed as one of the options (Change) in the ACR setup shown in FIG. 8A This system and other implementations of the technology disclosed can include one or more of the following features and/or features described in connection with additional systems disclosed. In the interest of conciseness, the combinations of features disclosed in this application are not individually enumerated and are not repeated with each base set of features. The reader will understand how features identified in this section can readily be combined with sets of base features identified as implementations such as a system or CRM (computer readable media). Features in this application can be combined with features in the two related applications that are incorporated by reference.

The time interval, applicable creating to the second block, can be expressed in minutes, hours, days, weeks or months after a time parameter appearing in the first block of cells or could be set to Real-time (as exampled in FIG. 8A-B).

The creation trigger parameter for the second block is a time parameter. It can select days of a week on which to trigger the creation, such as workdays or Wednesdays. In some implementations, the creation trigger parameter for the second block is based on availability of updated data from the external source. The second block creation is responsive to the adjusted formulaic data specification in the second block.

For some implementations of the disclosed method, the formulaic specification received from the user includes a trigger parameter that specifies real time updating of the cells from a live data source, when the user is looking at data in the spreadsheet, by an automatic refresh of a query used to get data from the live data source.

Some implementations of this method further include receiving an update parameter for when second data in the second block should be updated with the second data from the external data source, based on changes in the second data that is responsive to the adjusted formulaic data specification in the second block for the second data. The update parameter can specify how often and until when second data in the second block should be updated with the second data from the external data source (as shown in FIG. 5C-D).

In some implementations, the replication position is to the left of a column. Then, creation of the second block at the replication position further includes moving existing cells to rightward to insert the second block. Similarly, the replication position can be the above of a row. Then, creation of the second block at the replication position further includes moving existing cells to down to insert the second block.

The creation position for the second block can be a new tab, also referred to as a worksheet, which can be created when creating the second block. Or, it can be a new spreadsheet, created to hold the second block. The creation position for the second block can be a new presentation slide, created when creating the second block.

The second block can include the second data plus a chart with chart elements reflective of the second data. Depending on the selection of the user, it can involve updating a chart or chart, adding to a chart (as exampled in FIG. 6A-B) or charts, or creating an entirely new chart or charts (as exampled in FIG. 7).

Further implementations of the automated replication of formulaic data and calculations can be setup to generate results that are then automatically uploaded to one or more external systems without the use of macros or embedded programming languages, as is shown in FIG. 12A to FIG. 12D.

These method implementations of the technology disclosed also can be practiced as a device or system. A device can include program instructions in a memory coupled to one or more processors that cause the device to locally implement any of the methods disclosed. A system can include a local device running a browser or light weight interface, which uses network-based web apps and connects to a server, instead of using traditional applications to implement the technology disclosed.

Yet another implementation may include a tangible, non-transitory computer readable storage media loaded with computer program instructions that, when combined with computer hardware and executed, cause a computer to implement any of the methods described earlier. In this application, tangible computer readable storage media do not include non-patentable transitory signals. While the technology disclosed could be implemented using transitory signals, reference to tangible computer readable storage media does not include the non-patentable transitory signals. If the law changes and transitory signals become patentable, separate claims may be made to transitory signals.

Yet another implementation may include a tangible, non-transitory computer readable media, including program instructions loaded onto the media that, when combined with and executed on computer hardware, implements any of the devices or systems described.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

I claim:

1. A method of automating creation of a new block of cells in a spreadsheet, including:
   receiving a user identification of a first block of contiguous cells in a spreadsheet, a plurality of cells in the first block holding formulas that specify access to first data from an external source using a formulaic specification of the first data;
   causing display of a panel of controls that are operable without user input of scripting or macro code, and receiving a user specification of a replication position at which a second block of cells is to be replicated as a variation on the first block;
   receiving a user specification of a temporal interval relationship between the first and second blocks;
   receiving a creation trigger parameter for when the second block should be replicated at the second position; and
   after reaching a time established using the creation trigger parameter, creating the second block at the replication position and inserting in cells of the second block an adjusted formulaic specification for second data, based on the formulaic specification for the first data and the temporal interval relationship between the first and second blocks.

2. The method of claim 1, wherein the temporal interval, applicable to creating the second block, is expressed in minutes, hours, days, weeks or months after a time parameter appearing in the first block of cells.

3. The method of claim 2, wherein the formulaic specification received from the user includes a trigger parameter that specifies real time updating of the cells from a live data source, when the user is looking at data in the spreadsheet, by an automatic refresh of a query used to get data from the live data source.

4. The method of claim 1, wherein the creation trigger parameter for the second block is a time parameter.

5. The method of claim 1, wherein the creation trigger parameter for the second block is a time parameter that selects days of a week on which to trigger the creation.

6. The method of claim 1, wherein the creation trigger parameter for the second block is a subscription parameter based on availability of updated data from the external source, responsive to the adjusted formulaic data specification in the second block for the second data.

7. The method of claim 1, further including:
   receiving an update parameter for when second data in the second block should be updated with the second data from the external data source, based on changes in the second data that is responsive to the adjusted formulaic data specification in the second block for the second data.

8. The method of claim 1, further including:
   receiving an update parameter for how often and until when second data in the second block should be updated with the second data from the external data source, based on changes in the second data that is responsive to the adjusted formulaic data specification in the second block for the second data.

9. The method of claim 1, wherein the replication position is to the left of a column and creation of the second block at the replication position further includes moving existing cells to rightward to insert the second block.

10. The method of claim 1, wherein the replication position is to the above of a row and creation of the second block at the replication position further includes moving existing cells to down to insert the second block.

11. The method of claim 1, wherein the position for creation of the second block is a new tab, further including creating the new tab when creating the second block.

12. The method of claim 11, wherein the second block includes the second data and a chart with chart elements reflective of the second data.

13. The method of claim 1, wherein a position for creation of the second block is a new worksheet, further including creating the new worksheet when creating the second block.

14. The method of claim 1, wherein the position for creation of the second block is a new presentation slide, further including creating the new presentation slide when creating the second block.

15. The method of claim 1, wherein the position for creation of the second block is a new presentation slide in a new presentation, further including creating the new presentation and presentation slide when creating the second block.

16. The method of claim 1, wherein automated replication of the formulaic data and related calculations automatically generates results that are uploaded to one or more external systems.

17. A tangible computer readable storage media loaded with instructions that, when executed on computer hardware, cause the hardware to carry out a method of automating creation of a new block of cells in a spreadsheet, including:
   receiving a user identification of a first block of contiguous cells in a spreadsheet, a plurality of cells in the first block holding formulas that specify access to first data from an external source using a formulaic specification of the first data;
   causing display of a panel of controls that are operable without user input of scripting or macro code, and receiving a user specification of a replication position at which a second block of cells is to be replicated as a variation on the first block;
   receiving a user specification of a temporal interval relationship between the first and second blocks;
   receiving a creation trigger parameter for when the second block should be replicated at the second position; and
   after reaching a time established using the creation trigger parameter, creating the second block at the replication position and inserting in cells of the second block an adjusted formulaic specification for second data, based on the formulaic specification for the first data and the temporal interval relationship between the first and second blocks.

18. The tangible computer readable storage media of claim 17, further including:
   receiving an update parameter for when second data in the second block should be updated with the second data from the external data source, based on changes in the second data that is responsive to the adjusted formulaic data specification in the second block for the second data.

19. The tangible computer readable storage media of claim 17, further including:

receiving an update parameter for how often and until when second data in the second block should be updated with the second data from the external data source, based on changes in the second data that is responsive to the adjusted formulaic data specification in the second block for the second data.

20. A device including a processor and memory, the memory loaded with instructions that, when executed, cause the processor to carry out a method of automating creation of a new block of cells in a spreadsheet, including:

receiving a user identification of a first block of contiguous cells in a spreadsheet, a plurality of cells in the first block holding formulas that specify access to first data from an external source using a formulaic specification of the first data;

causing display of a panel of controls that are operable without user input of scripting or macro code, and receiving a user specification of a replication position at which a second block of cells is to be replicated as a variation on the first block;

receiving a user specification of a temporal interval relationship between the first and second blocks;

receiving a creation trigger parameter for when the second block should be replicated at the second position; and after reaching a time established using the creation trigger parameter, creating the second block at the replication position and inserting in cells of the second block an adjusted formulaic specification for second data, based on the formulaic specification for the first data and the temporal interval relationship between the first and second blocks.

* * * * *